United States Patent
Chendamarai Kannan et al.

(10) Patent No.: US 10,349,404 B2
(45) Date of Patent: Jul. 9, 2019

(54) DISCOVERY REFERENCE SIGNAL TRANSMISSION AND DECODING AND MEASUREMENT TECHNIQUES IN A WIRELESS COMMUNICATION SYSTEM

(71) Applicant: QUALCOMM Incorporated, San Diego, CA (US)

(72) Inventors: Arumugam Chendamarai Kannan, San Diego, CA (US); Andrei Dragos Radulescu, San Diego, CA (US); Chirag Patel, San Diego, CA (US); Tao Luo, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/493,099

(22) Filed: Apr. 20, 2017

(65) Prior Publication Data

US 2017/0311316 A1   Oct. 26, 2017

Related U.S. Application Data

(60) Provisional application No. 62/326,695, filed on Apr. 22, 2016.

(51) Int. Cl.
*H04W 4/00* (2018.01)
*H04W 72/04* (2009.01)
(Continued)

(52) U.S. Cl.
CPC ....... *H04W 72/0446* (2013.01); *H04W 48/16* (2013.01); *H04W 72/10* (2013.01);
(Continued)

(58) Field of Classification Search
CPC ................................................. H04W 72/0466
See application file for complete search history.

(56) References Cited

U.S. PATENT DOCUMENTS

2012/0236798 A1*  9/2012  Raaf .................... H04B 7/0452
                                                              370/328
2012/0322483 A1*  12/2012  Jl ............................. H04L 5/00
                                                              455/509
(Continued)

FOREIGN PATENT DOCUMENTS

WO   WO-2017162813 A1   9/2017

OTHER PUBLICATIONS

IPEA/EP, Second Written Opinion of the International Preliminary Examining Authority, Int'l Application No. PCT/US2017/028745, dated May 7, 2018, European Patent Office, Munich, DE, 12 pgs.

(Continued)

*Primary Examiner* — Farah Faroul
(74) *Attorney, Agent, or Firm* — Holland & Hart LLP

(57) ABSTRACT

Methods, systems, and devices for wireless communication are described. A user equipment (UE) may monitor for discovery reference signal (DRS) transmissions, physical downlink shared channel (PDSCH) transmissions, or combinations thereof within a DRS transmission window. The UE may attempt to decode DRS or PDSCH transmissions for a subframe based on detection of DRS transmissions, prioritization of DRS transmissions relative to PDSCH transmissions, locations of subframes within a radio frame, overlapping of the DRS transmission window with a paging opportunity, or any combination thereof. In some cases, one or more radio link monitoring (RLM) parameters may be adjusted based on decoding of PDSCH or DRS transmissions.

30 Claims, 24 Drawing Sheets

(51) Int. Cl.
  *H04W 72/10* (2009.01)
  *H04W 48/16* (2009.01)
  *H04L 5/00* (2006.01)
  *H04W 16/14* (2009.01)
  *H04W 68/00* (2009.01)

(52) U.S. Cl.
  CPC ........... *H04L 5/0048* (2013.01); *H04W 16/14* (2013.01); *H04W 68/00* (2013.01)

(56) References Cited

U.S. PATENT DOCUMENTS

| | | | | |
|---|---|---|---|---|
| 2013/0044727 | A1* | 2/2013 | Nory | H04L 5/0092 370/330 |
| 2014/0098761 | A1* | 4/2014 | Lee | H04W 74/006 370/329 |
| 2014/0133472 | A1* | 5/2014 | Su | H04W 48/16 370/336 |
| 2015/0085795 | A1* | 3/2015 | Papasakellariou | H04L 5/006 370/329 |
| 2016/0080094 | A1* | 3/2016 | Kim | H04L 5/001 455/63.1 |
| 2016/0081093 | A1* | 3/2016 | Hugl | H04J 11/005 370/329 |
| 2016/0095093 | A1 | 3/2016 | Yi et al. | |
| 2017/0099126 | A1* | 4/2017 | Yoo | H04L 5/0048 |
| 2017/0134148 | A1* | 5/2017 | Yerramalli | H04L 5/0094 |
| 2017/0135029 | A1* | 5/2017 | Chendamarai Kannan | H04W 8/005 |
| 2017/0251499 | A1* | 8/2017 | Radulescu | H04B 17/318 |
| 2017/0359826 | A1* | 12/2017 | Islam | H04L 5/0048 |

OTHER PUBLICATIONS

Ericsson, "Leftover UE Capabilities for LAA," Change Request, 3GPP TSG-RAN WG2 Meeting #93, R2-161823, Malta, Feb. 15-19, 2016, 4 pgs., XP051081292, 3rd Generation Partnership Project.

ISA/EP, International Search Report and Written Opinion of the International Searching Authority, Int'l Application No. PCT/US2017/028745, dated Sep. 20, 2017, European Patent Office, Rijswijk, NL, 26 pgs.

LG Electronics, "DRS Design in LAA", 3GPP TSG RAN WG1 Meeting #83, R1-156860, Anaheim, USA, Nov. 15-22, 2015, 5 pgs., XP051022544, 3rd Generation Partnership Project.

ISA/EPO, Partial International Search Report of the International Searching Authority, Int'l App. No. PCT/US2017/028745, dated Jul. 4, 2017, European Patent Office, Rijswijk, NL, 18 pgs.

Sequans Communications, "On Enhanced Complexity Reduction of DL Control Blind Decoding," 3GPP TSG-RAN WG1 Meeting #83, R1-157154, Anaheim, USA, Nov. 16-22, 2015, 5 pgs., XP051003412, 3rd Generation Partnership Project.

Sharp, "Multiplexing of DRS and PDSCH for LAA," 3GPP TSG RAN WG1 Meeting #83, R1-157115, Anaheim, USA, Nov. 15-22, 2015, 5 pgs., XP051040011, 3rd Generation Partnership Project.

* cited by examiner

DISCOVERY REFERENCE SIGNAL TRANSMISSION AND DECODING AND MEASUREMENT TECHNIQUES IN A WIRELESS COMMUNICATION SYSTEM

CROSS REFERENCES

The present application for Patent claims priority to U.S. Provisional Patent Application No. 62/326,695 by Chendamarai Kannan, et al., entitled "Discovery Reference Signal Transmission and Decoding and Measurement Techniques in a Wireless Communication System," filed Apr. 22, 2016, assigned to the assignee hereof.

BACKGROUND

The following relates generally to wireless communication and more specifically to discovery reference signal (DRS) transmission and decoding techniques in a wireless communication system.

Wireless communication systems are widely deployed to provide various types of communication content such as voice, video, packet data, messaging, broadcast, and so on. These systems may be capable of supporting communication with multiple users by sharing the available system resources (e.g, time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

SUMMARY

A user equipment (UE) in accordance with various aspects of the disclosure may have limited capability to test multiple different scrambling hypotheses for transmissions received in a particular subframe of a radio frame. In some examples, a discovery reference signal (DRS) may be transmitted in a subframe within a DRS transmission window (DTxW) using a search space and scrambling that is different than a search space and scrambling that would be used for transmission of a physical downlink shared channel (PDSCH) transmission in that particular subframe. Thus, the UE that has capability to test only one scrambling hypothesis for receptions within a subframe may, in some examples, identify whether scrambling for the DRS transmission or PDSCH transmission will be tested for a particular subframe.

In some examples, the UE may, within a DTxW, decode transmissions based on a DRS scrambling hypothesis until the DRS is detected, and then switch to decoding subsequent transmissions of subsequent subframes based on a PDSCH scrambling hypothesis. In some examples, a base station may recognize that a UE may not be able to test multiple scrambling hypotheses, and may schedule DRS transmissions during a first available subframe within a DTxW, in order to allow the UE to switch to PDSCH scrambling more quickly and allow additional available subframes that may be used for PDSCH transmissions to the UE. Such a base station may, in some cases, transmit the DRS in a subframe following one or more subframes with PDSCH transmissions and identify that the PDSCH transmissions may not have been received at the UE. The base station in such cases may discount such lack of reception when performing link adaptation, such as by selecting a modulation and coding scheme (MCS) as if the PDSCH transmissions were received.

In some examples, a UE may monitor for PDSCH transmissions within a DTxW, and one or more radio link monitoring (RLM) parameters may be adjusted based on the assumption that the UE missed a DRS in the DTxW. For example, a UE may modify a RLM evaluation window to account for a DRS that is assumed to have been missed, or a UE may modify a block error rate (BLER) weighting that would otherwise be applied in the event of a missed DRS. In some examples, a base station may modify one or more thresholds associated with a RLM parameter based on a missed DRS in such a situation. For example, the base station may modify a $Q_{out}$ threshold for declaring a radio link failure (RLF) at the UE.

A method of wireless communication is described. The method may include identifying a user equipment (UE) capability to monitor multiple scrambling hypotheses for transmissions received within a subframe, identifying one or more subframes within a discovery reference signal (DRS) transmission window (DTxW) and attempting to decode a DRS transmission or a physical downlink shared channel (PDSCH) transmission in the one or more subframes based at least in part on the UE capability.

An apparatus for wireless communication is described. The apparatus may include means for identifying a UE capability to monitor multiple scrambling hypotheses for transmissions received within a subframe, means for identifying one or more subframes within a DTxW and means for attempting to decode a DRS transmission or a PDSCH transmission in the one or more subframes based at least in part on the UE capability.

A further apparatus is described. The apparatus may include a processor, memory in electronic communication with the processor, and instructions stored in the memory. The instructions may be operable to cause the processor to identify a UE capability to monitor multiple scrambling hypotheses for transmissions received within a subframe, identify one or more subframes within a DTxW and attempt to decode a DRS transmission or a PDSCH transmission in the one or more subframes based at least in part on the UE capability.

A non-transitory computer readable medium for wireless communication is described. The non-transitory computer-readable medium may include instructions to cause a processor to identify a UE capability to monitor multiple scrambling hypotheses for transmissions received within a subframe, identify one or more subframes within a DTxW and attempt to decode a DRS transmission or a PDSCH transmission in the one or more subframes based on the UE capability.

In some examples of the method, apparatus, or non-transitory computer-readable medium described above, attempting to decode the DRS transmission or PDSCH transmission comprises: applying a first scrambling hypothesis to a first subframe of the one or more subframes. Some examples of the method, apparatus, or non-transitory computer-readable medium described above may further include processes, features, means, or instructions for attempting to decode the DRS transmission in the first subframe. Some examples of the method, apparatus, or non-transitory computer-readable medium described above may further include processes, features, means, or instructions for applying the first scrambling hypothesis to a second subframe of the one or more subframes subsequent to the first subframe based on unsuccessfully decoding the DRS transmission in the first subframe. Some examples of the method, apparatus, or non-transitory computer-readable medium described above may further include processes, features, means, or instructions for applying a second scrambling hypothesis to the second subframe based on successfully decoding the DRS transmission in the first subframe.

Some examples of the method, apparatus, or non-transitory computer-readable medium described above may further include processes, features, means, or instructions for determining that a PDSCH transmission is to be monitored during at least a subset of subframes within the DTxW. In some examples of the method, apparatus, or non-transitory computer-readable medium described above, attempting to decode the DRS transmission or PDSCH transmission comprises: identifying a distinct scrambling hypothesis for each subframe within the subset of subframes to be monitored for the PDSCH transmission. Some examples of the method, apparatus, or non-transitory computer-readable medium described above may further include processes, features, means, or instructions for attempting to decode one or more subframes within the subset of subframes based on the identified distinct scrambling hypothesis associated with each of the one or more subframes within the subset.

Some examples of the method, apparatus, or non-transitory computer-readable medium described above may further include processes, features, means, or instructions for determining, at each subframe in the DRS transmission window, that the DRS transmission was not previously successfully decoded in the DRS transmission window, determining that the subframe is not to be monitored for a high priority PDSCH transmission, and attempting to decode the DRS transmission using a same scrambling hypothesis as prior attempted decode of the DRS transmission in the DRS transmission window.

In some examples of the method, apparatus, or non-transitory computer-readable medium described above, attempting to decode the DRS transmission or PDSCH transmission further comprises: attempting to decode, subsequent to the subset of subframes that are to be monitored for the PDSCH transmission, the DRS transmission in at least a third subframe and a fourth subframe within the DTxW using a same scrambling hypothesis. In some examples of the method, apparatus, or non-transitory computer-readable medium described above, the same scrambling hypothesis used for attempting to decode the DRS transmission corresponds to a scrambling hypothesis for subframe zero or subframe five of a radio frame.

Some examples of the method, apparatus, or non-transitory computer-readable medium described above may further include processes, features, means, or instructions for determining that the DRS transmission could have been missed in the subset of subframes monitored for the PDSCH transmission. Some examples of the method, apparatus, or non-transitory computer-readable medium described above may further include processes, features, means, or instructions for adjusting a block error rate (BLER) weighting based on an assumption that the DRS transmission was missed.

Some examples of the method, apparatus, or non-transitory computer-readable medium described above may further include processes, features, means, or instructions for determining that the DRS transmission could have been missed in the subset of subframes monitored for the high priority PDSCH transmission. Some examples of the method, apparatus, or non-transitory computer-readable medium described above may further include processes, features, means, or instructions for adjusting a radio link monitoring (RLM) evaluation window based on an assumption that the DRS transmission was missed.

In some examples of the method, apparatus, or non-transitory computer-readable medium described above, attempting to decode the DRS transmission or PDSCH transmission comprises: applying a first scrambling hypothesis to a first subset of subframes within the DTxW until the DRS transmission is detected. Some examples of the method, apparatus, or non-transitory computer-readable medium described above may further include processes, features, means, or instructions for applying a second scrambling hypothesis to each of one or more subframes of a second subset of subframes within the DRS transmission window to attempt to decode the PDSCH transmission, the second subset may be subsequent to the first subset of subframes. Some examples of the method, apparatus, or non-transitory computer-readable medium described above may further include processes, features, means, or instructions for signaling to a base station that the first subset of subframes were not monitored for the PDSCH transmission.

In some examples of the method, apparatus, or non-transitory computer-readable medium described above, the DTxW is a first DTxW, and where attempting to decode the DRS transmission or the PDSCH transmission comprises attempting to decode the DRS transmission in subframes of the first DTxW, and where the method further comprises: identifying one or more subframes within a second DTxW. Some examples of the method, apparatus, or non-transitory computer-readable medium described above may further include processes, features, means, or instructions for attempting to decode the PDSCH transmission in the one or more subframes of the second DTxW.

Some examples of the method, apparatus, or non-transitory computer-readable medium described above may further include processes, features, means, or instructions for determining that a scheduled paging opportunity during which a paging message may be transmitted to the UE overlaps with the DTxW, the paging opportunity comprising a set of subframes to be monitored for the paging message. Some examples of the method, apparatus, or non-transitory computer-readable medium described above may further include processes, features, means, or instructions for shifting the set of subframes to be monitored for the paging message to be non-overlapping with the DTxW.

In some examples of the method, apparatus, or non-transitory computer-readable medium described above, shifting the set of subframes to be monitored for the paging message to be non-overlapping with the DTxW comprises: shifting the set of subframes to start a determined number of subframes following the DRS transmission, the start of the DTxW, or the start of the scheduled paging opportunity.

In some examples of the method, apparatus, or non-transitory computer-readable medium described above, the determined number of subframes is based on a UE specific identifier, a starting subframe number of the paging opportunity, or a combination thereof. Some examples of the method, apparatus, or non-transitory computer-readable medium described above may further include processes, features, means, or instructions for signaling the UE capability to a base station.

A method of wireless communication is described. The method may include identifying a UE capability to monitor for a DRS and a PDSCH transmission within a same subframe and determining one or more parameters associated with at least one of a DRS transmission or PDSCH transmission based at least in part on the UE capability.

An apparatus for wireless communication is described. The apparatus may include means for identifying a UE capability to monitor for a DRS and a PDSCH transmission within a same subframe and means for determining one or more parameters associated with at least one of a DRS transmission or PDSCH transmission based at least in part on the UE capability.

A further apparatus is described. The apparatus may include a processor, memory in electronic communication with the processor, and instructions stored in the memory. The instructions may be operable to cause the processor to identify a UE capability to monitor for a DRS and a PDSCH transmission within a same subframe and determine one or more parameters associated with at least one of a DRS transmission or PDSCH transmission based at least in part on the UE capability.

A non-transitory computer readable medium for wireless communication is described. The non-transitory computer-readable medium may include instructions to cause a processor to identify a UE capability to monitor for a DRS and a PDSCH transmission within a same subframe and determine one or more parameters associated with at least one of a DRS transmission or PDSCH transmission based on the UE capability.

In some examples of the method, apparatus, or non-transitory computer-readable medium described above, the determining one or more parameters comprises: modifying a radio link monitoring (RLM) threshold based on the UE capability. In some examples of the method, apparatus, or non-transitory computer-readable medium described above, the determining one or more parameters comprises: selecting a subframe for DRS transmission based on the UE capability.

In some examples of the method, apparatus, or non-transitory computer-readable medium described above, the selecting a subframe for DRS transmission comprises selecting a subframe having a same scrambling sequence as used for the DRS transmission. In some examples of the method, apparatus, or non-transitory computer-readable medium described above, the selecting a subframe for DRS transmission comprises selecting a first subframe within a DTxW for DRS transmission.

In some examples of the method, apparatus, or non-transitory computer-readable medium described above, the determining one or more parameters further comprises: selecting a DRS subframe within a DTxW for DRS transmission that is subsequent to one or more other subframes within the DTxW. Some examples of the method, apparatus, or non-transitory computer-readable medium described above may further include processes, features, means, or instructions for transmitting PDSCH transmissions in the one or more other subframes. Some examples of the method, apparatus, or non-transitory computer-readable medium described above may further include processes, features, means, or instructions for receiving a negative acknowledgment (NACK) for the PDSCH transmissions in the one or more other subframes. Some examples of the method, apparatus, or non-transitory computer-readable medium described above may further include processes, features, means, or instructions for discounting the NACK in a link adaptation procedure based on the UE capability.

In some examples of the method, apparatus, or non-transitory computer-readable medium described above, the determining one or more parameters comprises: determining that a PDSCH transmission is transmitted in a subframe during which the UE is monitoring for DRS transmissions. Some examples of the method, apparatus, or non-transitory computer-readable medium described above may further include processes, features, means, or instructions for retransmitting the PDSCH transmission based on determining that the PDSCH transmission is transmitted in the subframe during which the UE is monitoring for DRS transmissions and the UE capability.

In some examples of the method, apparatus, or non-transitory computer-readable medium described above, the determining one or more parameters comprises: selecting one or more subframes for a paging transmission that is outside of a DTxW. In some examples of the method, apparatus, or non-transitory computer-readable medium described above, the determining one or more parameters comprises: determining that a paging opportunity overlaps with a DTxW. Some examples of the method, apparatus, or non-transitory computer-readable medium described above may further include processes, features, means, or instructions for selecting one or more subframes within the DTxW for a paging transmission that have a same scrambling sequence as the DRS transmission.

In some examples of the method, apparatus, or non-transitory computer-readable medium described above, the determining one or more parameters comprises: determining that a paging opportunity during which a paging message may be transmitted to the UE overlaps with a DTxW, the paging opportunity comprising a set of subframes for transmission of the paging message. Some examples of the method, apparatus, or non-transitory computer-readable medium described above may further include processes, features, means, or instructions for shifting the set of subframes for transmission of the paging message to be non-overlapping with the DTxW.

In some examples of the method, apparatus, or non-transitory computer-readable medium described above, shifting the set of subframes to be monitored for the paging message to be non-overlapping with the DTxW comprises: shifting the set of subframes to start a determined number of subframes following the DRS transmission, the start of the DTxW, or the start of the paging opportunity. In some examples of the method, apparatus, or non-transitory computer-readable medium described above, the determined number of subframes is based on a UE specific identifier, a starting subframe number of the paging opportunity, or a combination thereof. Some examples of the method, apparatus, or non-transitory computer-readable medium described above may further include processes, features, means, or instructions for receiving signaling from the UE indicating the UE capability.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
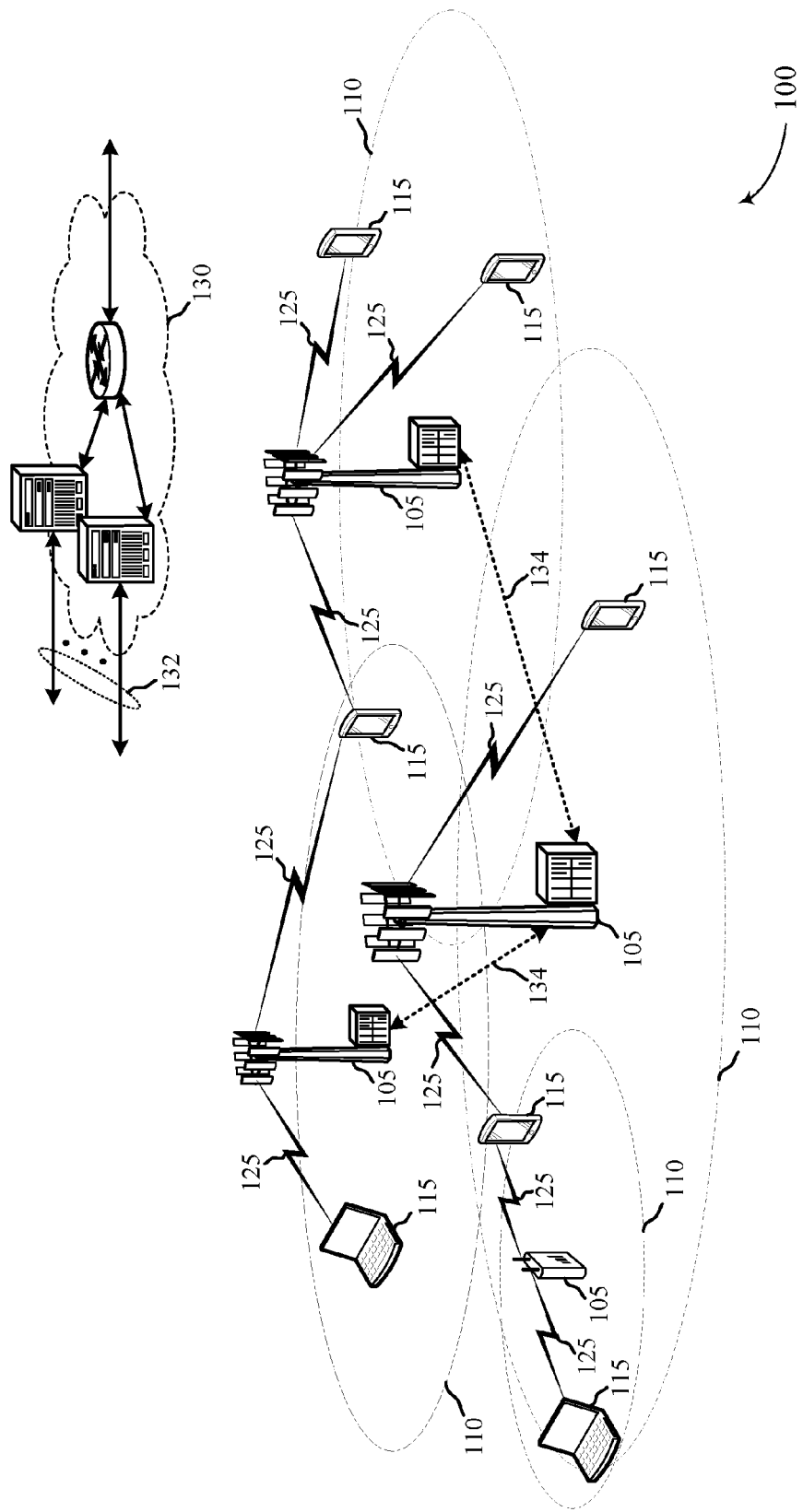
FIG. 1 illustrates an example of a wireless communications system that supports discovery reference signal (DRS) transmission and decoding techniques in accordance with aspects of the present disclosure.

A user equipment (UE) may, during a certain time duration, monitor for either a discovery reference signal (DRS) from one base station or another downlink transmission another base station. This may increase the likelihood of receiving the DRS or the other downlink transmission. For instance, some UEs may, due to their capability or configuration, have an increased likelihood of successfully decoding one signal, such as DRS, if the UE refrains from currently monitoring for other signals, such as downlink control or data. A UE may, for example, have limited ability to concurrently monitor multiple scrambling hypothesis. So the UE may benefit from monitoring for one or another signal (e.g., DRS or downlink data), if multiple signals may be concurrently transmitted from a base station and if those signals may use the same scrambling sequence.

By way of example, a UE may monitor a DRS in order to perform measurements on a serving cell. A DRS may include synchronization signals, cell specific reference signals, a master information block (MIB) and other signaling useful for identifying or attaching to a cell. A base station may transmit DRS during periodically configured DRS transmission windows (DTxWs). The UE may measure cell DRS according to periodically configured DRS measurement timing configuration (DMTC) periods. The DMTC may be configured for measurements of a serving cell or neighbor cells, or both. Further, the DMTC may be frequency specific or may be applicable to multiple frequencies in various examples. For example, a DTxW may be configured to have a 40 ms periodicity and a duration of 1 ms to 10 ms.

In some cases, a base station may transmit a DRS to enable one or more UEs to identify, evaluate, and connect to the base station. The DRS may also be used, along with one or more other signals, to determine one or more radio link monitoring (RLM) parameters. In some cases, the DRS may be transmitted during a DRS transmission window (DTxW), and may have scrambling and search spaces corresponding to a subset of scrambling and search spaces that may be used for other transmissions. In some cases, a UE may or may not be able to monitor both subframe specific scrambling (e.g., unicast PDSCH in MulteFire) and DRS scrambling (e.g., subframe 0 or subframe 5 during DTxW) at the same time and UE monitoring capability of performing multiple decoding hypotheses may be considered to handle such cases. In some examples, where lost DRS events may affect RLM parameters (e.g., block error rate (BLER) weighting, Qout thresholds, etc.), UE monitoring capability may be factored in estimating RLM parameters. In some examples, a prioritization between DRS monitoring and unicast PDSCH monitoring may be used during paging operations in light of UE monitoring capability.

In some examples, a DRS may be transmitted using scrambling and search spaces corresponding to a subset of scrambling and search spaces that may be used for other transmissions, such as physical downlink shared channel (PDSCH) transmissions. In some examples, if a DRS is transmitted in subframes zero through four of a radio frame, the DRS may use scrambling and a physical downlink control channel (PDCCH) search space corresponding to subframe zero, and if a DRS is transmitted in subframes five through nine of a radio frame, the DRS may use scrambling and a PDCCH search space corresponding to subframe five. This may be in contrast with a scheme of using subframe specific scrambling and search space (e.g., unicast PDSCH in MulteFire). Monitoring of DRS and PDSCH transmissions during a DTxW may thus be limited for a UE that is not capable of performing multiple decoding hypotheses.

Such a UE, in some examples, may identify whether scrambling for the DRS transmission or PDSCH transmission will be tested for a particular subframe according to one or more techniques such as described herein. In some examples, the UE may, within a DTxW, decode transmissions based on a DRS scrambling hypothesis until the DRS is detected, and then switch to decoding subsequent transmissions of subsequent subframes based on a PDSCH scrambling hypothesis. In some examples, a base station may recognize that a UE may not be able to test multiple scrambling hypotheses, and may schedule DRS transmissions during a first available subframe within a DTxW, in order to allow the UE to switch to PDSCH scrambling more quickly and allow additional available subframes that may be used for PDSCH transmissions to the UE. Such a base station may, in some cases, transmit the DRS in a subframe following one or more subframes with PDSCH transmissions and identify that the PDSCH transmissions may not have been received at the UE. The base station in such cases may discount such lack of reception when performing link adaptation, such as by selecting a modulation and coding scheme (MCS) as if the PDSCH transmissions were received. Additionally, in some examples, a base station may schedule higher priority PDSCH transmissions, such as paging transmissions, for the UE in subframes where the UE will be able to decode PDSCH and DRS transmissions, such as in subframes 0 and 5 within a DTxW.

In some examples, a UE may monitor for PDSCH transmissions within a DTxW, and one or more radio link monitoring (RLM) parameters may be adjusted based on the assumption that the UE missed a DRS in the DTxW. For example, a UE may modify a RLM evaluation window to account for a DRS that is assumed to have been missed, or a UE may modify a block error rate (BLER) weighting that would otherwise be applied in the event of a missed DRS. In some examples, a base station may modify one or more thresholds associated with a RLM parameter based on a missed DRS in such a situation. For example, the base station may modify a $Q_{out}$ threshold for declaring a radio link failure (RLF) at the UE. In some examples, such a UE may identify that the PDSCH transmissions within the DTxW may be high priority PDSCH transmissions, such as paging transmissions, and prioritize monitoring for PDSCH over monitoring for DRS.

In some examples, a UE may alternate between DRS monitoring and PDSCH monitoring, when PDSCH monitoring requirements frequently overlap with DTxW windows. In such cases, a base station may identify that the UE may be alternating between DRS and PDSCH monitoring, and in instances where DRS monitoring is being performed, transmit pages in subframes 0 or 5, or retransmit pages following transmission of a DRS or subsequent to a DTxW. In some examples, paging opportunities may be allocated for UEs capable of only single hypothesis scrambling testing that are outside of a DTxW, and thus missed PDSCH transmissions within a DTxW for such UEs may not impact reception of paging transmissions.

In some examples, if a paging opportunity ambiguously overlaps a DRS, the paging opportunity may be adjusted such that there is no ambiguity for a UE that can only test a single scrambling hypothesis for a subframe. For example, a paging opportunity may be shifted to after the DTxW where the DRS overlapping occurred, such as by a determined number of subframes after one of DRS (if transmitted), the start or end of the DTxW, or the start or end of the paging opportunity. The determined number of subframes may be, for example, based on a deterministic function of a UE-specific identifier or a (sub)frame number for the paging opportunity. Such an ambiguous overlap of paging and DRS may occur, for example, when a base station may not page all UEs in a non-DTxW portion of a paging opportunity subframe (e.g., due to failure of a listen before talk (LBT) procedure of too many UEs to page within the non-DTxW paging resources), or if the base station was not able to page all UEs in the subframes subsequent to a successfully sent DRS.

Aspects of the disclosure introduced above, and additional features, are described next in the context of a wireless communication system. Examples of decoding and transmissions associated with a DTxW are then described. Aspects of the disclosure are further illustrated by and described with reference to apparatus diagrams, system diagrams, and flowcharts that relate to DRS transmission and decoding techniques.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. For example, wireless communications system 100 may include an LTE/LTE-A network, a MulteFire network, a neutral host small cell network, or the like, operating with overlapping coverage areas. A MulteFire network may include access points (APs) and/or base stations 105 communicating in an unlicensed radio frequency spectrum band, e.g., without a licensed frequency anchor carrier. For example, the MulteFire network may operate without an anchor carrier in the licensed spectrum. Wireless communications system 100 may support DRS transmission and decoding techniques which may, e.g., increase the efficiency of MulteFire communications within system 100.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g, S1, etc.). Base stations 105 may communicate with one another over backhaul links 134 (e.g, X2, etc.) either directly or indirectly (e.g, through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. Base stations 105 may also be MulteFire base stations 105, which may have limited or non-ideal backhaul links 134 with other base stations 105.

In some cases, a UE 115 or base station 105 may operate in a shared or unlicensed frequency spectrum. These devices may perform a clear channel assessment (CCA) prior to communicating in order to determine whether the channel is available. A CCA may include an energy detection procedure to determine whether there are any other active transmissions. For example, the device may infer that a change in a reference signal strength indication (RSSI) of a power meter indicates that a channel is occupied. Specifically, signal power is that is concentrated in a certain bandwidth and exceeds a predetermined noise floor may indicate another wireless transmitter. A CCA may also include detection of specific sequences that indicate use of the channel.

For example, another device may transmit a specific preamble prior to transmitting a data sequence. UEs 115 and base stations 105 operating in licensed or unlicensed spectrum may transmit discovery reference signals (DRS) to convey information for identifying of establishing a radio connection.

For example, DRS may include primary and secondary synchronization signals to enable a UE 115 to identify the timing and frequency range of a cell. After completing initial cell synchronization, a UE 115 may decode the master information block (MIB). The MIB may be transmitted on physical broadcast channel (PBCH) and may utilize the first 4 OFDMA symbols of the second slot of the first subframe of each radio frame. It may use the middle 6 resource block (RBs) (72 subcarriers) in the frequency domain. The MIB carries a few important pieces of information for UE initial access, including: DL channel bandwidth in term of RBs, physical HARQ indicator channel (PHICH) configuration (duration and resource assignment), and system frame number (SFN). A new MIB may be broadcast every fourth radio frame (SFN mod 4=0) at and rebroadcast every frame (10 ms). Each repetition may be scrambled with a different scrambling code.

After reading a MIB (either a new version or a copy), the UE 115 may can try different phases of a scrambling code until it gets a successful cyclic redundancy check (CRC). The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase.

After receiving the MIB, a UE may receive one or more system information block (SIBs). Different SIBs may be defined according to the type of system information (SI) conveyed and they may be defined for licensed frequency operation or unlicensed frequency operation, or both. In some examples, certain SIBs may be used by UEs 115 operating under a MulteFire scheme within system 100, while other SIBs may be used by UEs 115 operating on licensed frequencies.

For example, a UE 115 operating on licensed frequencies may decode SIB1 and SIB2, in addition to the MIB, prior to accessing the network. A new SIB1 may be transmitted in the fifth subframe of every eighth frame (SFN mod 8=0) and rebroadcast every other frame (20 ms). SIB1 includes access information, including cell identity (CID) information, and it may indicate whether a UE is allowed to camp on a cell of a base station 105. SIB1 also includes cell selection information (or cell selection parameters). Additionally, SIB1 includes scheduling information for other SIBs. SIB2 may be scheduled dynamically according to information in SIB1, and includes access information and parameters related to common and shared channels. The periodicity of SIB2 can be set to 8, 16, 32, 64, 128, 256 or 512 radio frames. In some cases, the periodicity and configuration of MIB and SIBS may be different for cells operating in licensed and unlicensed spectrum.

For UEs 115 operating on unlicensed frequencies, including those operating on MulteFire portions of system 100, the UE 115 may decode an enhanced SIB (eSIB). The eSIB may be broadcast (e.g., on PBCH) and may include system information equivalent to some fields or information included in other SIBs. For example, the eSIB may include information that may also be conveyed in SIB1 and SIB2 in licensed frequency operation, as described above. In some cases, the eSIB may include an indication of subframe configurations including, for example, whether certain subframes are multimedia broadcast single frequency network (MBSFN) subframes. The eSIB may support unlicensed operation because it may quickly provide information (e.g., frame-type or subframe configuration) to a UE 115 after cell acquisition.

In some cases, a UE 115 may monitor a communication link 125 continuously for an indication that the UE 115 may receive data. In other cases (e.g., to conserve power and extend battery life) a UE 115 may be configured with a DRX cycle. A DRX cycle includes an "on duration" when the UE 115 may monitor for control information (e.g, on PDCCH or C-PDCCH) and a "DRX period" when the UE115 may power down radio components. In some cases, a UE 115 may be configured with a short DRX cycle and a long DRX cycle. In some cases, a UE 115 may enter a long DRX cycle if it is inactive for one or more short DRX cycles.

In some cases, wireless communications system 100 may utilize one or more enhanced component carriers (eCCs). An eCC may be characterized by one or more features including flexible bandwidth, different transmission time intervals (TTIs), and modified control channel configuration. In some cases, an eCC may be associated with a carrier aggregation (CA) configuration or a dual connectivity configuration (e.g, when multiple serving cells have a suboptimal backhaul link). An eCC may also be configured for use in unlicensed spectrum or shared spectrum (e.g, where more than one operator is licensed to use the spectrum).

As described herein, a DRS may be transmitted using scrambling and search spaces corresponding to a subset of scrambling and search spaces that may be used for other transmissions, such as PDSCH transmissions. In some examples, if a DRS is transmitted in subframes zero through four of a radio frame, the DRS may use scrambling and a PDCCH search space corresponding to subframe zero, and if a DRS is transmitted in subframes five through nine of a radio frame, the DRS may use scrambling and a PDCCH search space corresponding to subframe five. Monitoring of DRS and PDSCH transmissions during a DTxW may thus be limited for a UE 115 that is not capable of performing multiple decoding hypotheses.

In some examples, a UE 115 may identify whether scrambling for the DRS transmission or PDSCH transmission will be tested for a particular subframe. In some examples, the UE 115 may, within a DTxW, decode transmissions based on a DRS scrambling hypothesis until the DRS is detected, and then switch to decoding subsequent transmissions of subsequent subframes based on a PDSCH scrambling hypothesis. In some examples, a base station 105 may recognize that a UE 115 may not be able to test multiple scrambling hypotheses, and may schedule DRS transmissions during a first available subframe within a DTxW, in order to allow the UE 115 to switch to PDSCH scrambling more quickly and allow additional available subframes that may be used for PDSCH transmissions to the UE 115. Such a base station 105 may, in some cases, transmit the DRS in a subframe following one or more subframes with PDSCH transmissions and identify that the PDSCH transmissions may not have been received at the UE 115. The base station 105 in such cases may discount such lack of reception when performing link adaptation, such as by selecting a modulation and coding scheme (MCS) as if the PDSCH transmissions were received. Additionally, in some examples, a base station 105 may schedule higher priority PDSCH transmissions, such as paging transmissions, for the UE 115 in subframes where the UE 115 will be able to decode PDSCH and DRS transmissions, such as in subframes 0 and 5 within a DTxW.

In some examples, a UE 115 may monitor for PDSCH transmissions within a DTxW, and one or more RLM parameters may be adjusted based on the assumption that the UE 115 missed a DRS in the DTxW. For example, a UE 115 may modify a RLM evaluation window to account for a DRS that is assumed to have been missed, or a UE 115 may modify a BLER weighting that would otherwise be applied in the event of a missed DRS. In some examples, a base station 105 may modify one or more thresholds associated with a RLM parameter based on a missed DRS in such a situation. For example, the base station 105 may modify a $Q_{out}$ threshold for declaring a RLF at the UE 115. In some examples, such a UE 115 may identify that the PDSCH transmissions within the DTxW may be high priority PDSCH transmissions, such as paging transmissions, and prioritize monitoring for PDSCH over monitoring for DRS.

In some examples, a UE 115 may alternate between DRS monitoring and PDSCH monitoring, when PDSCH monitoring requirements frequently overlap with DTxW windows. In such cases, a base station 105 may identify that the UE 115 may be alternating between DRS and PDSCH monitoring, and in instances where DRS monitoring is being performed, transmit pages in subframes 0 or 5, or retransmit pages following transmission of a DRS or subsequent to a DTxW. In some examples, paging opportunities may be allocated for a UE 115 capable of only single hypothesis scrambling testing that are outside of a DTxW, and thus missed PDSCH transmissions within a DTxW for such a UE 115 may not impact reception of paging transmissions.

In some examples, if a paging opportunity ambiguously overlaps a DRS, the paging opportunity may be adjusted such that there is no ambiguity for a UE 115 that can only test a single scrambling hypothesis for a subframe. For example, a paging opportunity may be shifted to after the DTxW where the DRS overlapping occurred, such as by a determined number of subframes after one of DRS (if transmitted), the start or end of the DTxW, or the start or end of the paging opportunity. The determined number of subframes may be, for example, based on a deterministic function of a UE-specific identifier or a (sub)frame number for the paging opportunity. Such an ambiguous overlap of paging and DRS may occur, for example, when a base station 105 may not page all UE 115s in a non-DTxW portion of a paging opportunity subframe (e.g., due to failure of a listen before talk (LBT) procedure of too many UEs 115 to page within the non-DTxW paging resources), or if the base station 105 was not able to page all UEs 115 in the subframes subsequent to a successfully sent DRS.

In some examples, DTxW configuration may be exchanged between base stations, to assist with mobility measurements. In some examples, a first access point may receive a communication signal from a second network node regarding the configuration of a third access point's DTxW configuration, and may use the communication to assist UE measurements of the access point's signal quality. In some examples, the communication signal may be received over a backhaul network connection, or over the air. The second network node may be a configuration node, an access point, or may be the same as the third access point. In some examples, the UE measurements may be assisted by synchronizing the first access point's DTxW transmission with the third access point's DTxW transmission. In some examples, the UE measurements may be assisted by informing the UE of the third access point's DTxW configuration. In some examples, the DTxW configuration constrains the absolute or relative timing of the third access point's DTxW transmission. In certain examples, the DTxW configuration constrains the length, or periodicity, or offset of the DTxW configuration.

Figure 2:
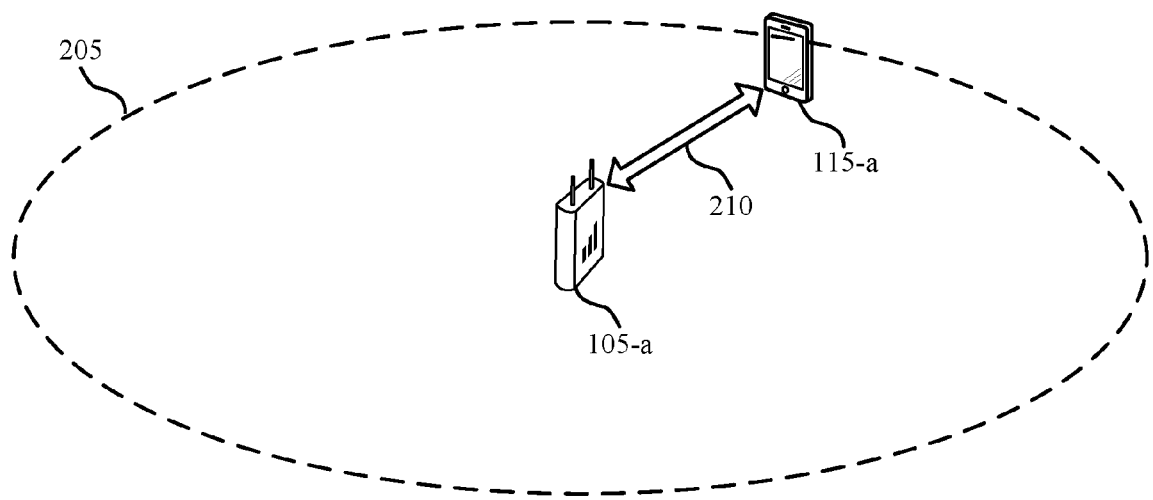
FIG. 2 illustrates an example of a portion of a wireless communications system that supports DRS transmission and decoding techniques in accordance with aspects of the present disclosure.

FIG. 2 illustrates an example of a wireless communications system 200 for DTxW detection and discovery signal measurement configuration. Wireless communications system 200 may include UE 115-a and a base stations 105-a (supporting serving cell 205), which may be examples of the corresponding devices described with reference to FIG. 1. Wireless communications system 200 may include base stations 105 employing a MulteFire scheme that support DRS and PDSCH transmissions and decoding according to various techniques described herein.

UE 115-a may be camped on, or connected to serving cell 205, and may use a DRS from base station 105-a. UE 115-a and base station 105-a may communicate via communications link 210, which may be used to communicate the DRS and other uplink and downlink transmissions, such as PDSCH transmissions. Base station 105-a may transmit DRS (e.g, on serving cell 205-a) during a periodically configured DTxW. UE 115-a may measure the DRS according to periodically configured monitoring periods (e.g, a DMTC). The DMTC may apply to serving cell 205-a, a neighbor cell, or both. Further, the DMTC may be applicable to one or multiple frequencies. As indicated above, the UE 115-a may be capable of only testing one scrambling hypothesis for a particular received subframe. Furthermore, as discussed above, DRS may be transmitted using a subframe 0 or 5 scrambling and search space, while PDSCH transmissions may be transmitted using different scrambling and search spaces for each subframe.

Figure 3:
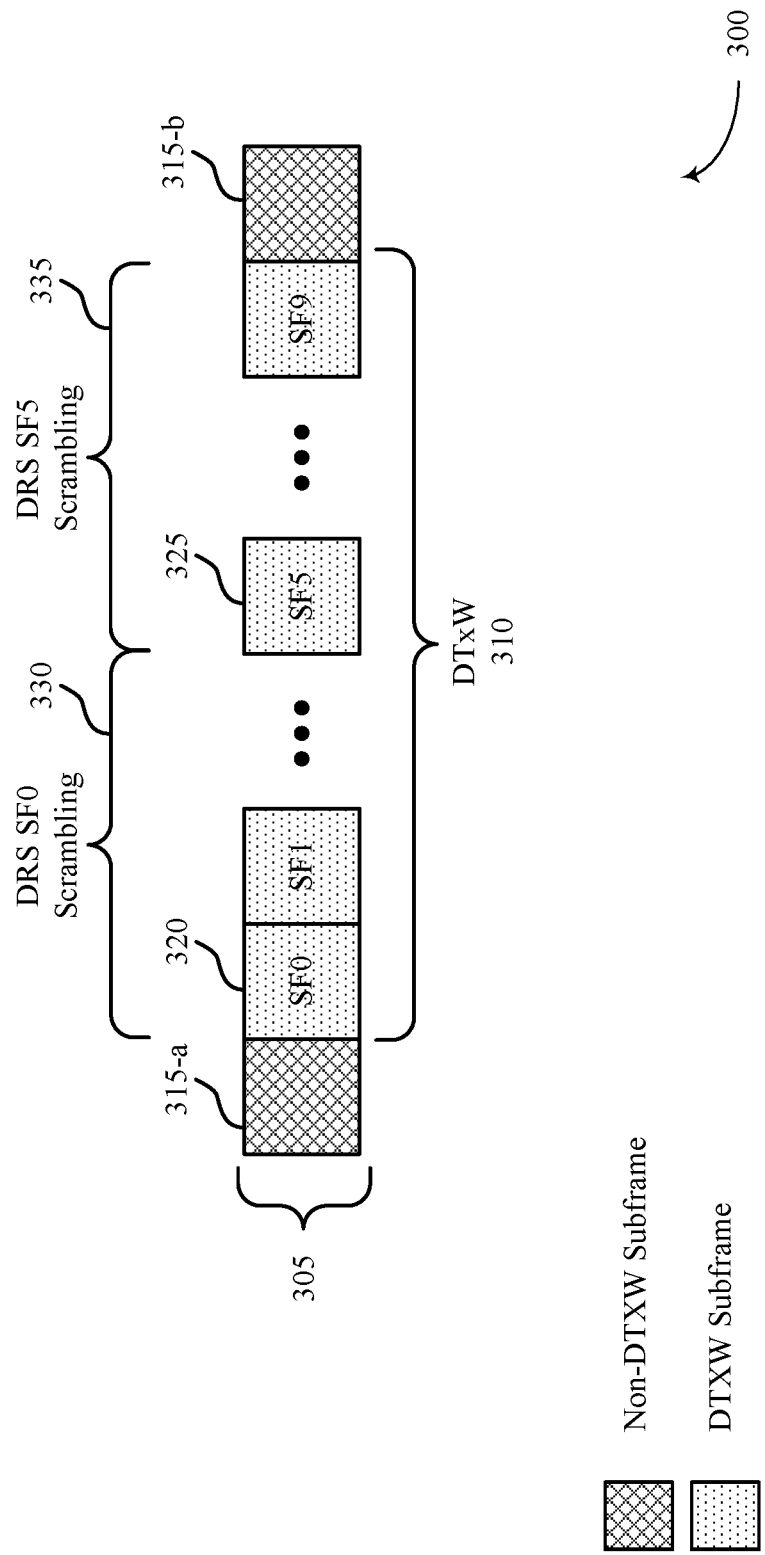
FIG. 3 illustrates an example of a DTxW and DRS scrambling for different subframes in accordance with aspects of the present disclosure.

FIG. 3 illustrates an example 300 of a DTxW and DRS scrambling for different subframes in accordance with aspects of the present disclosure. In some cases, the DTxW and DRS scrambling may represent aspects of techniques performed by a UE 115 or base station 105 as described with reference to FIGS. 1-2.

In this example, downlink transmissions 305 may include a number of subframes, with non-DTxW subframes 315 and DTxW subframes 320-325 that are within a DTxW 310. As discussed above, in some examples DRS transmissions may use subframe 0 or subframe 5 scrambling and search spaces. For example, for DRS transmissions within subframes 0 through 4 330, subframe 0 320 scrambling and PDCCH search space may be used, and for DRS transmissions within subframes 5 through 9 335, subframe 5 325 scrambling and PDCCH search space may be used. For PDSCH transmissions within DTxW 310, subframe specific scrambling and search spaces may be used. Accordingly, a UE that is not capable of testing multiple scrambling hypotheses for a subframe may be able to test only PDSCH or DRS scrambling for certain subframes, and may miss a transmission other than the one being tested for. In UEs have sufficient processing resources available, multiple hypothesis testing may be performed, and such UEs may receive both DRS and PDSCH transmissions. In some examples, as indicated above, a base station or a UE may use certain techniques to enhance communications in cases where a UE may be capable of testing a single scrambling hypothesis for a particular subframe.

Figure 4A:
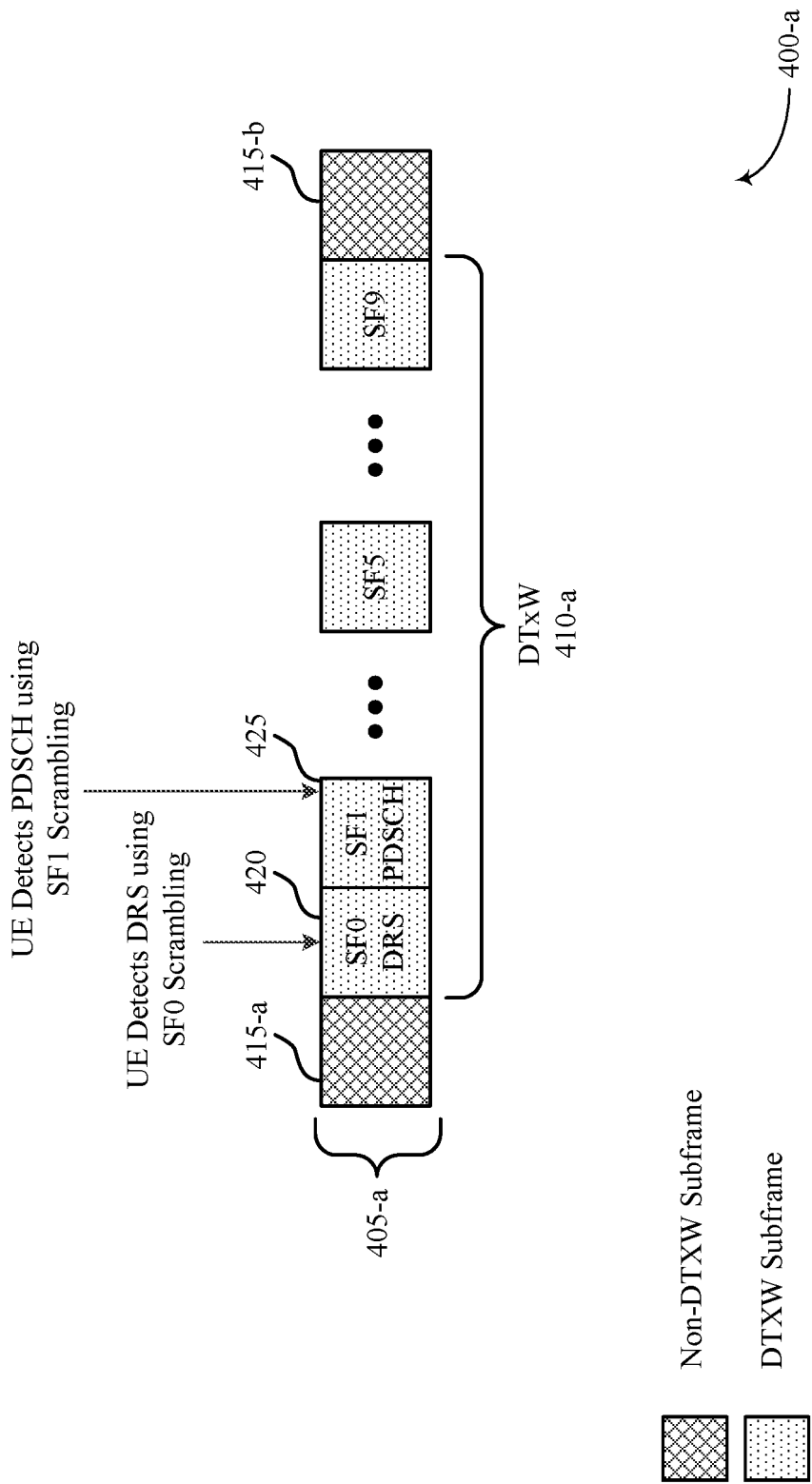
FIGS. 4A through 4C illustrate examples of transmission and decoding techniques for DRS and physical downlink shared channel (PDSCH) transmissions in accordance with aspects of the present disclosure.
Figure 4B:
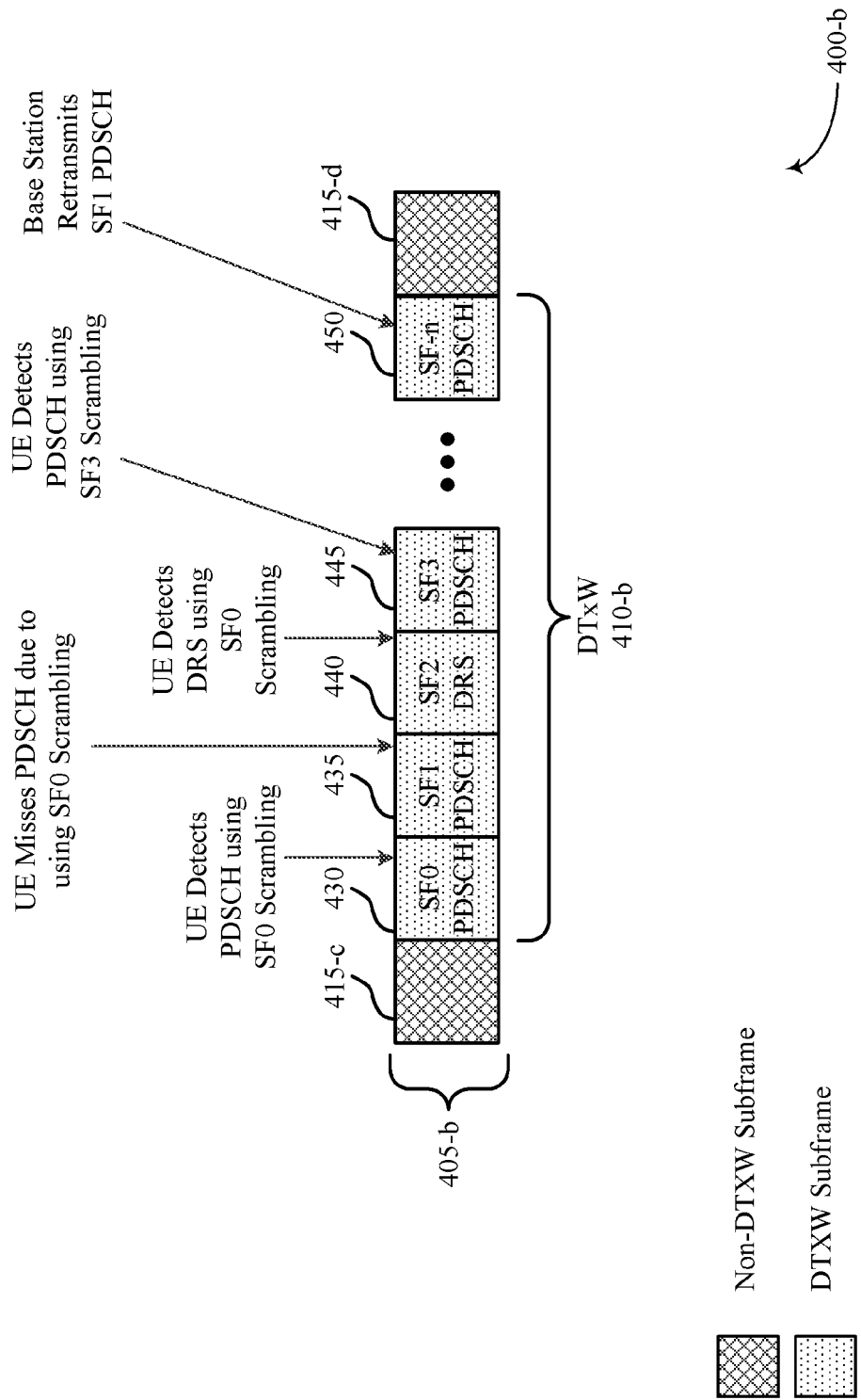
Figure 4C:
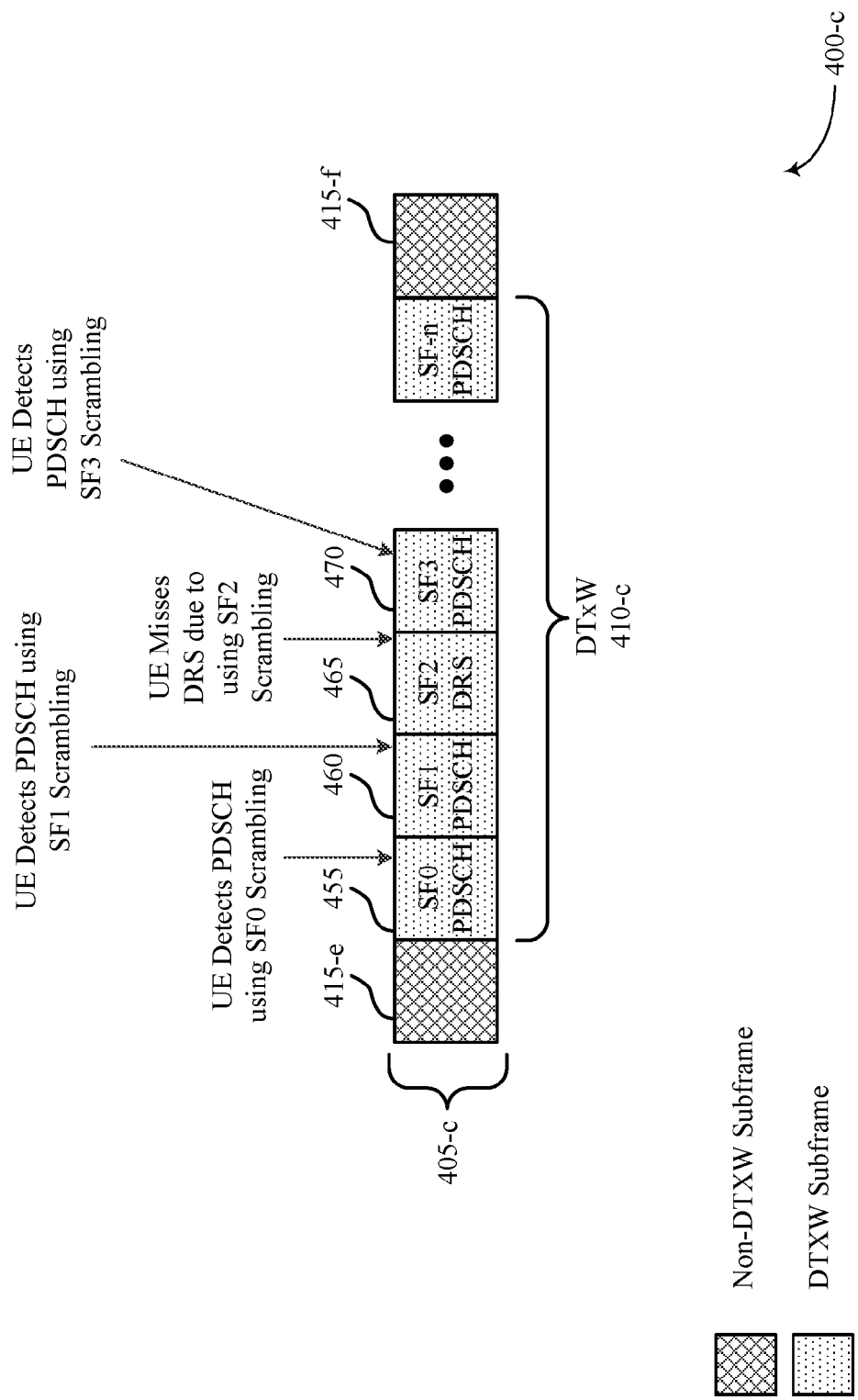

FIGS. 4A-4C illustrate examples of transmission and decoding techniques for DRS and PDSCH transmissions in accordance with aspects of the present disclosure. In some cases, the transmission and decoding techniques of FIGS. 4A-4C may represent aspects of techniques performed by a UE 115 or base station 105 as described with reference to FIGS. 1-2.

With reference first to FIG. 4A, an example **400-*a* is discussed in which downlink transmissions 405-*a* include non-DTxW subframes 415 and DTxW subframes 420-425 that are transmitted in DTxW 410-*a*. In this example, a UE may, within DTxW 410-*a*, decode transmissions based on a DRS scrambling hypothesis until the DRS is detected, and then switch to decoding subsequent transmissions of subsequent subframes based on a PDSCH scrambling hypothesis. Thus, in this example, a UE may decode subframe 0 420 based on subframe 0 scrambling, and detect the DRS transmitted in subframe 0 420. Based on the detection of the DRS, the UE may switch to a PDSCH-based scrambling hypothesis, and may detect a PDSCH transmission in subframe 1 425 using a scrambling hypothesis associated with subframe 1 425. The UE may decode PDSCH transmissions from other subframes of DTxW 410-*a*** in a similar manner, and thus efficiency may be enhanced in communications to the UE.

In other examples, such as illustrated in FIG. 4B, DRS may be transmitted in a later subframe which may result in a UE missing one or more earlier PDSCH transmissions within DTxW **410-*b*. In the example 400-*b* of FIG. 4B, downlink transmissions 405-*b* include non-DTxW subframes 415 and DTxW subframes 430-450 that are transmitted in DTxW 410-*b*. In this example, a UE may, within DTxW 410-*b*, again decode transmissions based on a DRS scrambling hypothesis until the DRS is detected, and then switch to decoding subsequent transmissions of subsequent subframes based on a PDSCH scrambling hypothesis. Thus, in this example, DRS may be transmitted in subframe 2 440, and PDSCH transmissions may be included in subframe 0 430 and subframe 1 435. In the example of FIG. 4B, a UE that is capable of single hypothesis testing may decode subframe 0 430 based on subframe 0 scrambling, and detect the PDSCH transmission therein. Likewise, the UE may attempt to decode the transmission of subframe 1 435 based on subframe 0** scrambling, as the DRS has not yet been detected.

The UE in this example thus misses the PDSCH transmission of subframe 1 435. The UE may then decode the DRS transmitted in subframe 2 440 using subframe 0 scrambling. Because the UE has detected the DRS, the UE may then attempt to decode the PDSCH transmission in subframe 3 445 based on subframe 3 scrambling, and may detect the PDSCH transmission therein. In some examples, a base station may determine, or be signaled, that the UE is capable only of single hypothesis testing. The base station may, in some examples, retransmit PDSCH transmissions within subframes prior to the DRS that had a different scrambling than the DRS scrambling hypothesis. In this example, the base station may retransmit the PDSCH transmission from subframe 1 435 in subframe n 450. In some examples, such a retransmission may be performed automatically or in response to the lack of an acknowledgment of receipt of the PDSCH transmission on subframe 1 435. In some examples, the base station may allow that subframes sent before DRS in subframe 2 440 may be lost, and in some cases a base station may discount such subframes for the purposes of link adaptation (e.g., the scheduling MCS may not (significantly) account for the absence of ACK from subframe 1 435). In some examples, a base station may perform DTX detection on uplink UL feedback, or the UE can send an explicit indication that it was not monitoring the subframe-specific scrambling during the allocation.

In other examples, a UE may prioritize PDSCH transmissions ahead of DRS transmissions, and attempt to decode PDSCH rather than DRS transmissions in received subframes. In the example **400-*c* of FIG. 4C, downlink transmissions 405-*c* include non-DTxW subframes 415 and DTxW subframes 455-470 that are transmitted in DTxW 410-*c*. In this example, a UE may, within DTxW 410-*c*, decode transmissions based on a PDSCH scrambling hypothesis. Such a prioritization may be based on, for example, determining that a paging opportunity overlaps with DTxW 410-*c***, with paging transmissions having higher priority for reception at the UE than DRS transmissions.

In the example of FIG. 4C, a UE may identify the non-DTxW subframes 415 and the DTxW subframes 455-470, and may decode the DTxW subframes 455-470 based on PDSCH decoding hypotheses for each DTxW subframe 455-470. In this example, the UE may detect PDSCH in subframe 0 455 based on subframe 0 scrambling, and may detect PDSCH in subframe 1 460 based on subframe 1 scrambling. At subframe 2 465, a DRS may be transmitted using subframe 0 scrambling, that may be missed by the UE due to the UE attempting to decode subframe 2 465 using a subframe 2 scrambling hypothesis. At subframe 3 470, the UE may detect PDSCH using subframe 3 scrambling. Thus, in this example, the DRS may be missed. In some examples, after a time period associated with the higher priority PDSCH transmissions (e.g., at the expiration of a paging opportunity), the UE may switch to monitoring for DRS using DRS scrambling hypotheses. In cases where a base station is aware that the UE does not test multiple hypotheses, the base station may transmit, or retransmit, a DRS after the time period associated with the higher priority PDSCH transmissions.

In some cases, one or more RLM parameters may be adjusted based on the assumption that the UE missed the DRS in the DTxW **410-*c*. For example, a UE may modify a RLM evaluation window to account for a DRS that is assumed to have been missed, or a UE may modify a block error rate (BLER) weighting or other RLM evaluation weight that would otherwise be applied in the event of a missed DRS. In some examples, a base station may modify one or more thresholds associated with a RLM parameter based on a missed DRS in such a situation. For example, the base station may modify a $Q_{out}$ threshold for declaring a radio link failure (RLF) at the UE. In some examples, such a UE may identify that the PDSCH transmissions within the DTxW 410-*c*** may be high priority PDSCH transmissions, such as paging transmissions, and prioritize monitoring for PDSCH over monitoring for DRS.

In some examples, a UE may alternate between DRS monitoring and PDSCH monitoring, when PDSCH monitoring requirements relatively frequently overlap with DTxWs. In such cases, a base station may identify that the UE may be alternating between DRS and PDSCH monitoring, and in instances where DRS monitoring is being performed, transmit pages in subframes 0 or 5, or retransmit pages following transmission of a DRS or subsequent to a DTxW. In some examples, paging opportunities may be allocated for UEs capable of only single hypothesis scrambling testing that are outside of a DTxW, and thus missed PDSCH transmissions within a DTxW for such UEs may not impact reception of paging transmissions.

Figure 5:
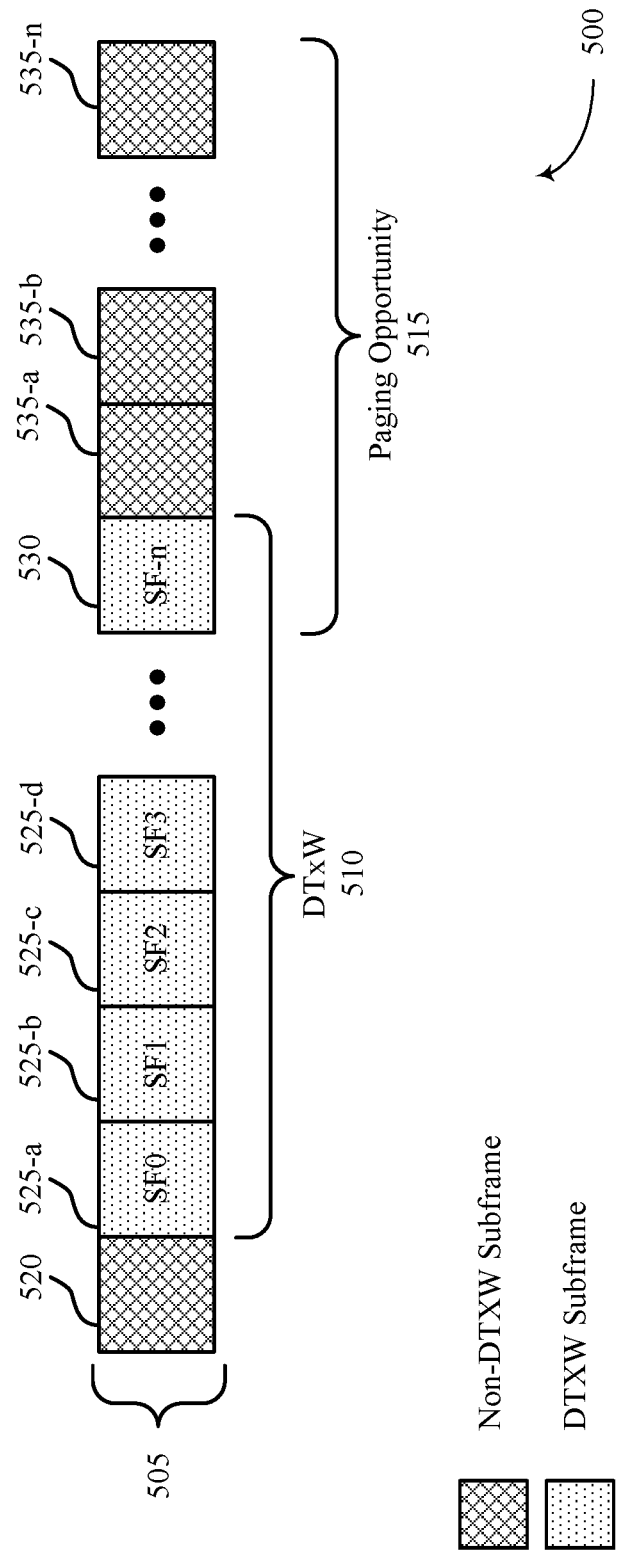
FIG. 5 illustrates an example of a DTxW and paging opportunity in accordance with aspects of the present disclosure.

FIG. 5 illustrates an example 500 of a DTxW and paging opportunity in accordance with aspects of the present disclosure. In some cases, the transmission and decoding techniques of FIG. 5 may represent aspects of techniques performed by a UE 115 or base station 105 as described with reference to FIGS. 1-2. In the example of FIG. 5, a UE may identify in downlink transmissions 505 non-DTxW subframes 520 and 535, and DTxW subframes 525-530. In this example, DTxW 510 may have one or more subframes that overlap with subframes of paging opportunity 515. In the illustration of FIG. 5, subframe-n 530 may be within both DTxW 510 and paging opportunity 515. In some examples, a base station may schedule pages to the UE to be in non-DTxW subframes 535 that are within paging opportunity 515. In other examples, a UE may prioritize PDSCH decoding in subframes that are within both DTxW 510 and paging opportunity 515. In such examples, the base station may identify the overlap and not schedule DRS during such overlapping subframes.

In some examples, the paging opportunity 515 may be adjusted such that there is no ambiguity for a UE that can only test a single scrambling hypothesis for each subframe. For example, a paging opportunity 515 may be shifted to begin after subframe-n 530, and after the DTxW 510. In some cases, the paging opportunity 515 may be shifted by a determined number of subframes after one of DRS (if transmitted), the start or end of the DTxW 510, or the start or end of the originally scheduled paging opportunity 515. The determined number of subframes may be, for example, based on a deterministic function of a UE-specific identifier or a (sub)frame number for the paging opportunity 515. Such an ambiguous overlap of paging and DRS may occur, for example, when a base station may not page all UEs in a non-DTxW subframes 535 within paging opportunity 515 (e.g., due to failure of a listen before talk (LBT) procedure of too many UEs to page within the non-DTxW subframes 535), or if the base station was not able to page all UEs in the subframes subsequent to a successfully sent DRS within DTxW 510. In some examples, a base station may consider the UE capability (e.g., by receiving signaling from the UE indicating capability in one or more capability bits) and may indicate in a paging instance of an upcoming eSIB change so that the UE may change to monitoring eSIB (DRS) in the upcoming DTxW(s).

Figure 6:
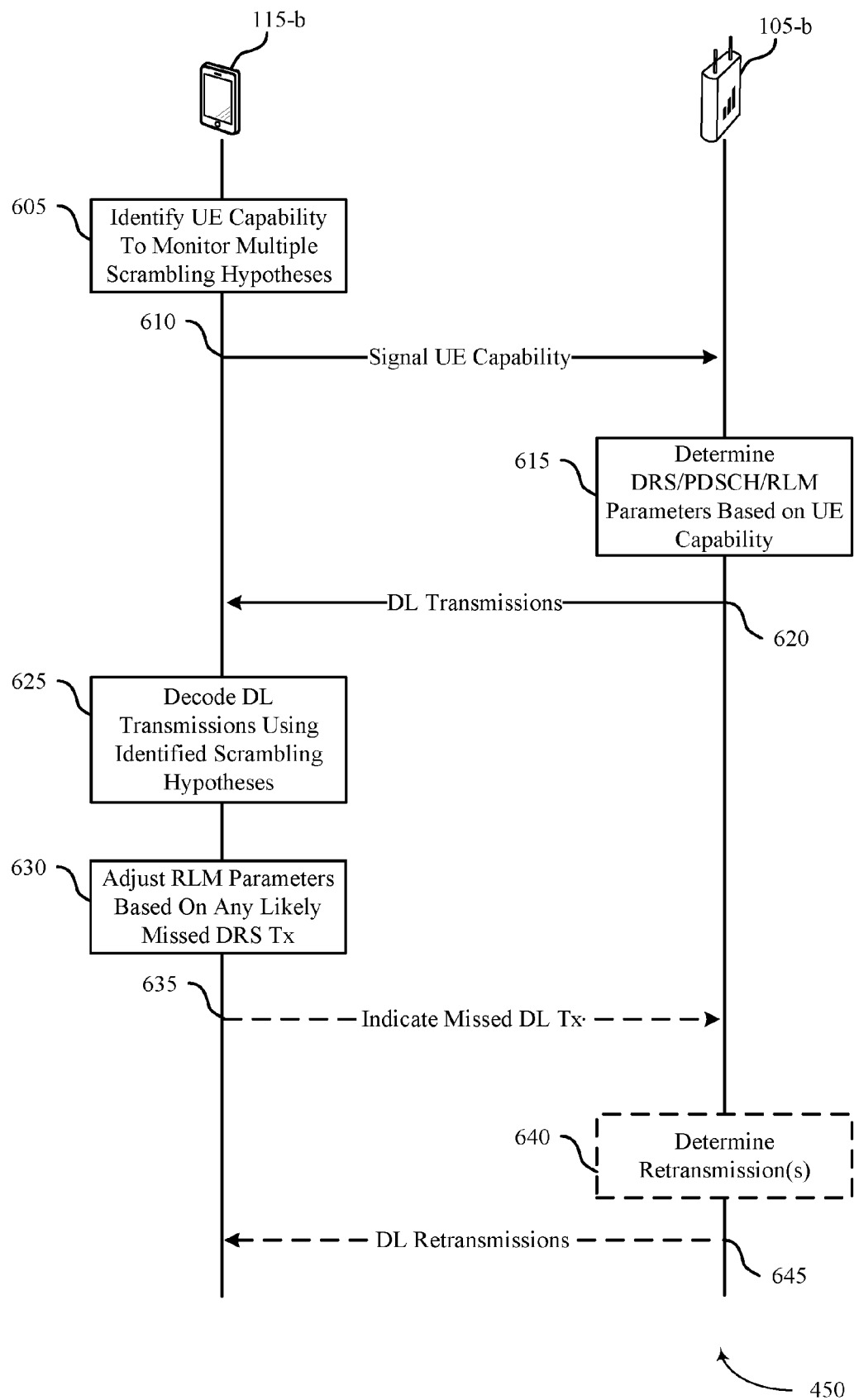
FIG. 6 illustrates an example of a process flow in a system that supports DRS transmission and decoding techniques in accordance with aspects of the present disclosure.

FIG. 6 illustrates an example of a process flow 600 process flow in a system that supports DRS transmission and decoding techniques in accordance with aspects of the present disclosure. Process flow 600 may include base station 105-*b* and UE 115-*b*, which may be examples of the corresponding devices described with reference to FIG. 1-2.

At block 605, the UE 115-*b* may identify its capability to monitor multiple scrambling hypotheses for a single subframe. Such an identification may be based on, for example, processing resources available to the UE, and may be configured at the UE. The UE 115-*b* may, in this example, signal the UE capability in transmission 610 to base station 105-*b*. The signaling may be through, for example, one or more configuration bits of the UE 115-*b* that are provided to the base statin 105-*b* during a connection establishment. At block 615, the base station 105-*b* may determine DRS parameters, PDSCH parameters, RLM parameters, or any combination thereof based on the UE capability. In examples where the UE 115-*b* does not signal its capability, the base station 105-*b* may infer the capability of the UE 115-*b* based on prior instances where the UE 115-*b* may have missed one or more PDSCH or DRS transmissions. The base station 105-*b* may transmit downlink transmissions 620 to the UE 115-*b*, which may include PDSCH transmissions, PDCCH transmissions, and DRS transmissions, for example.

At block 625, the UE 115-*b* may decode the downlink transmissions 620 according to identified scrambling hypotheses, such as through techniques as discussed above. At block 630, the UE 115-*b* may adjust one or more RLM parameters based on a likelihood of a missed DRS transmission due to monitoring of PDSCH transmissions rather than DRS transmissions, as discussed above. The UE 115-*b* may optionally transmit an indication 635 that one or more downlink transmissions were missed. The base station 105-*b*, in such cases, may determine retransmissions at block 640, and transmit the downlink retransmissions 645.

Figure 7:
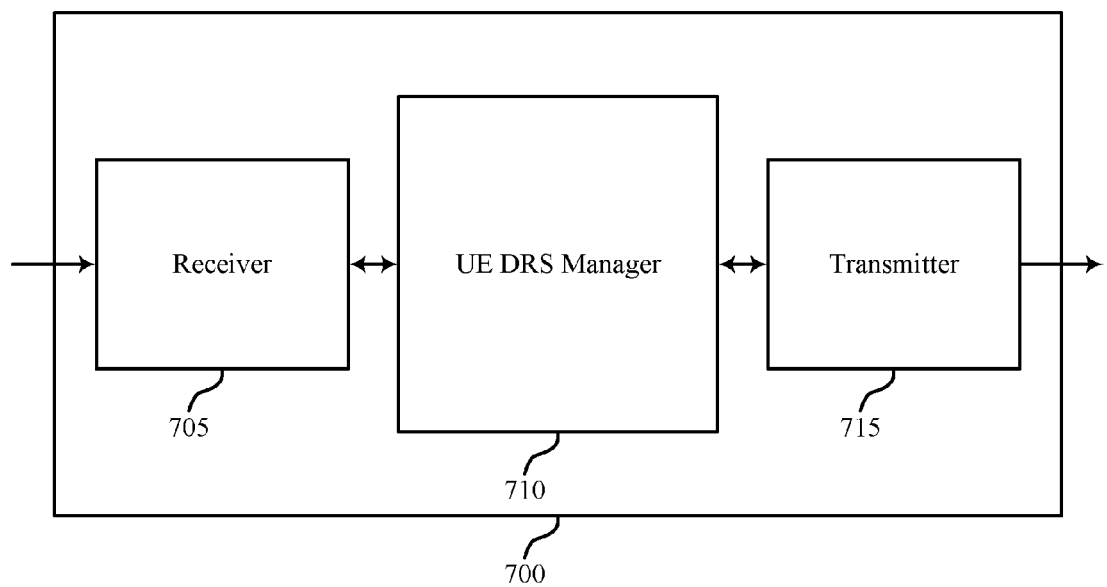
FIGS. 7 through 9 show block diagrams of a wireless device that supports DRS transmission and decoding in accordance with aspects of the present disclosure.

FIG. 7 shows a block diagram of a wireless device 700 that supports DRS transmission and decoding in accordance with various aspects of the present disclosure. Wireless device 700 may be an example of aspects of a UE 115 described with reference to FIGS. 1 and 2. Wireless device 700 may include receiver 705, UE DRS manager 710 and transmitter 715. Wireless device 700 may also include a processor. Each of these components may be in communication with each other.

The receiver 705 may receive information such as packets, user data, or control information associated with various information channels (e.g., control channels, data channels, and information related to DRS transmission and decoding, etc.). Information may be passed on to other components of the device. The receiver 705 may be an example of aspects of the transceiver 1025 described with reference to FIG. 10.

The UE DRS manager 710 may identify a UE capability to monitor multiple scrambling hypotheses for transmissions received within a subframe, identify one or more subframes within a DTxW, and attempt to decode a DRS transmission or a PDSCH transmission in the one or more subframes based on the UE capability. The UE DRS manager 710 may also be an example of aspects of the UE DRS manager 1005 described with reference to FIG. 10.

The transmitter 715 may transmit signals received from other components of wireless device 700. In some examples, the transmitter 715 may be collocated with a receiver in a transceiver module. For example, the transmitter 715 may be an example of aspects of the transceiver 1025 described with reference to FIG. 10. The transmitter 715 may include a single antenna, or it may include a plurality of antennas.

Figure 8:
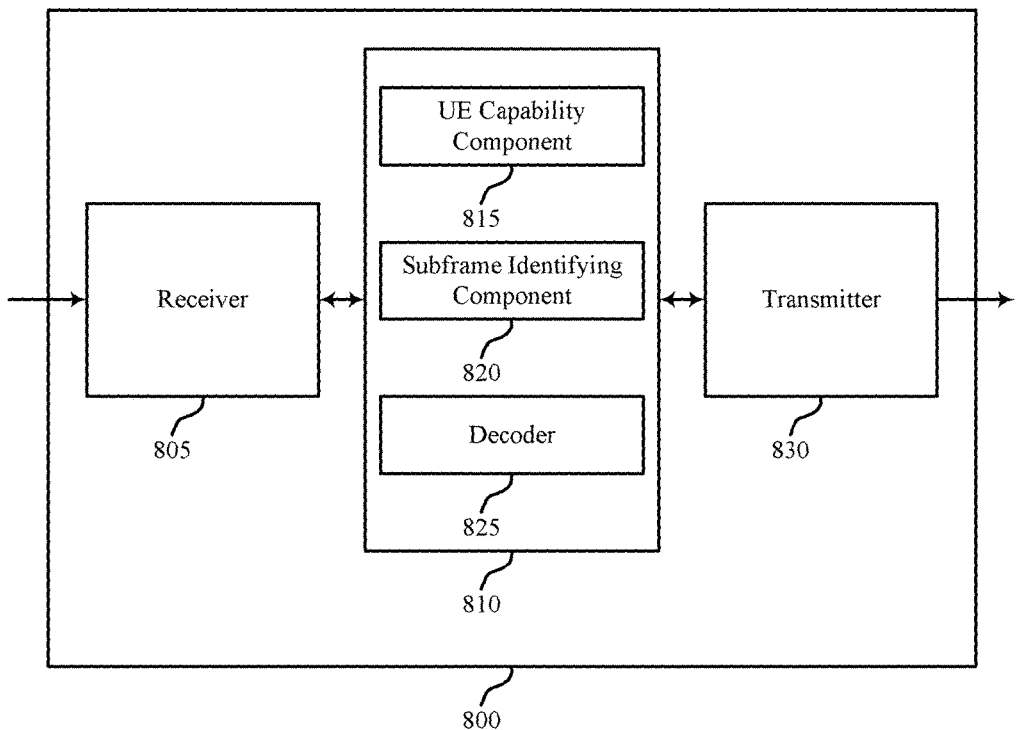

FIG. 8 shows a block diagram of a wireless device 800 that supports DRS transmission and decoding in accordance with various aspects of the present disclosure. Wireless device 800 may be an example of aspects of a wireless device 700 or a UE 115 described with reference to FIGS. 1, 2 and 7. Wireless device 800 may include receiver 805, UE DRS manager 810 and transmitter 830. Wireless device 800 may also include a processor. Each of these components may be in communication with each other.

The receiver 805 may receive information which may be passed on to other components of the device. The receiver 805 may also perform the functions described with reference to the receiver 705 of FIG. 7. The receiver 805 may be an example of aspects of the transceiver 1025 described with reference to FIG. 10.

The UE DRS manager 810 may be an example of aspects of UE DRS manager 710 described with reference to FIG. 7. The UE DRS manager 810 may include UE capability component 815, subframe identifying component 820 and decoder 825. The UE DRS manager 810 may be an example of aspects of the UE DRS manager 1005 described with reference to FIG. 10.

The UE capability component 815 may signal the UE capability to a base station, and identify a UE capability to monitor multiple scrambling hypotheses for transmissions received within a subframe.

The subframe identifying component 820 may identify one or more subframes within a DTxW. In some cases, the DTxW is a first DTxW, and where attempting to decode the DRS transmission or the PDSCH transmission comprises attempting to decode the DRS transmission in subframes of the first DTxW. In some examples, the subframe identifying component 820 may identify one or more subframes within a second DTxW, and the decoder 825 may apply the first scrambling hypothesis to a second subframe of the one or more subframes subsequent to the first subframe based on unsuccessfully decoding the DRS transmission in the first subframe, apply a second scrambling hypothesis to the second subframe based on successfully decoding the DRS transmission in the first subframe, attempt to decode one or more subframes within the subset of subframes based on the identified distinct scrambling hypothesis associated with each of the one or more subframes within the subset, and apply a distinct scrambling hypothesis to each of one or more subframes subsequent to the first subset of subframes to attempt to decode the PDSCH transmission.

The decoder 825 may also attempt to decode the PDSCH transmission in the one or more subframes of the second DTxW, attempt to decode a DRS transmission or a PDSCH transmission in the one or more subframes based on the UE capability, and attempt to decode the DRS transmission in the first subframe. In some cases, attempting to decode the DRS transmission or PDSCH transmission may include identifying a distinct scrambling hypothesis for each subframe within the subset of subframes to be monitored for the high priority PDSCH transmission. In some cases, attempting to decode the DRS transmission or PDSCH transmission further may include attempting to decode, subsequent to the subset of subframes that are to be monitored for the high priority PDSCH transmission, the DRS transmission in at least a third subframe and a fourth subframe within the DTxW using a same scrambling hypothesis.

In some cases, the same scrambling hypothesis used for attempting to decode the DRS transmission corresponds to a scrambling hypothesis for subframe zero or subframe five of a radio frame. In some cases, attempting to decode the DRS transmission or PDSCH transmission comprises: applying a first scrambling hypothesis to a first subset of subframes within the DTxW until the DRS transmission is detected. In some cases, attempting to decode the DRS transmission or PDSCH transmission comprises: applying a first scrambling hypothesis to a first subframe of the one or more subframes.

The transmitter 830 may transmit signals received from other components of wireless device 800. In some examples, the transmitter 830 may be collocated with a receiver in a transceiver module. For example, the transmitter 830 may be an example of aspects of the transceiver 1025 described with reference to FIG. 10. The transmitter 830 may utilize a single antenna, or it may utilize a plurality of antennas.

Figure 9:
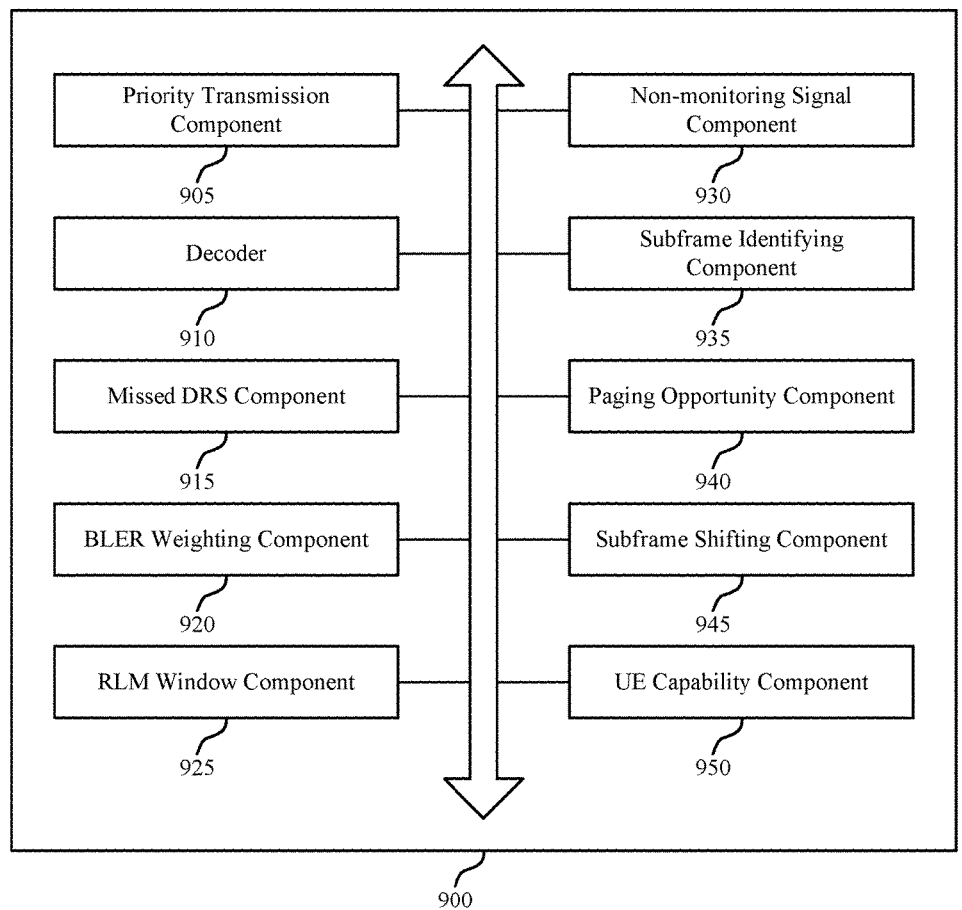

FIG. 9 shows a block diagram of a UE DRS manager 900 which may be an example of the corresponding component of wireless device 700 or wireless device 800. That is, UE DRS manager 900 may be an example of aspects of UE DRS manager 710 or UE DRS manager 810 described with reference to FIGS. 7 and 8. The UE DRS manager 900 may also be an example of aspects of the UE DRS manager 1005 described with reference to FIG. 10.

The UE DRS manager 900 may include priority transmission component 905, decoder 910, missed DRS component 915, BLER weighting component 920, RLM window component 925, non-monitoring signal component 930, subframe identifying component 935, paging opportunity component 940, subframe shifting component 945 and UE capability component 950. Each of these modules may communicate, directly or indirectly, with one another (e.g., via one or more buses).

The priority transmission component 905 may determine that a high priority PDSCH transmission is to be monitored during at least a subset of subframes within the DTxW.

The decoder 910 may apply the first scrambling hypothesis to a second subframe of the one or more subframes subsequent to the first subframe based on unsuccessfully decoding the DRS transmission in the first subframe, apply a second scrambling hypothesis to the second subframe based on successfully decoding the DRS transmission in the first subframe, attempt to decode one or more subframes within the subset of subframes based on the identified distinct scrambling hypothesis associated with each of the one or more subframes within the subset, apply a distinct scrambling hypothesis to each of one or more subframes subsequent to the first subset of subframes to attempt to decode the PDSCH transmission, attempt to decode the PDSCH transmission in the one or more subframes of the second DTxW, attempt to decode a DRS transmission or a PDSCH transmission in the one or more subframes based on the UE capability, and attempt to decode the DRS transmission in the first subframe.

The missed DRS component 915 may provide an assumption that a DRS transmission was missed in a subset of subframes monitored for the high priority PDSCH transmission. The BLER weighting component 920 may adjust a BLER weighting based on the assumption that the DRS transmission was missed. The RLM window component 925 may adjust an RLM evaluation window based on the assumption that the DRS transmission was missed. In some examples, the non-monitoring signal component 930 may signal to a base station that the first subset of subframes were not monitored for the PDSCH transmission. The subframe identifying component 935 may identify one or more subframes within a DTxW.

The paging opportunity component 940 may determine that a scheduled paging opportunity during which a paging message may be transmitted to the UE overlaps with the DTxW, the paging opportunity comprising a set of subframes to be monitored for the paging message. The subframe shifting component 945 may shift the set of subframes to be monitored for the paging message to be non-overlapping with the DTxW. In some cases, shifting the set of subframes to be monitored for the paging message to be non-overlapping with the DTxW comprises: shifting the set of subframes to start a determined number of subframes following the DRS transmission, the start of the DTxW, or the start of the scheduled paging opportunity. In some cases, the determined number of subframes is based on a UE specific identifier, a starting subframe number of the paging opportunity, or a combination thereof.

The UE capability component 950 may signal the UE capability to a base station, and identify a UE capability to monitor multiple scrambling hypotheses for transmissions received within a subframe.

Figure 10:
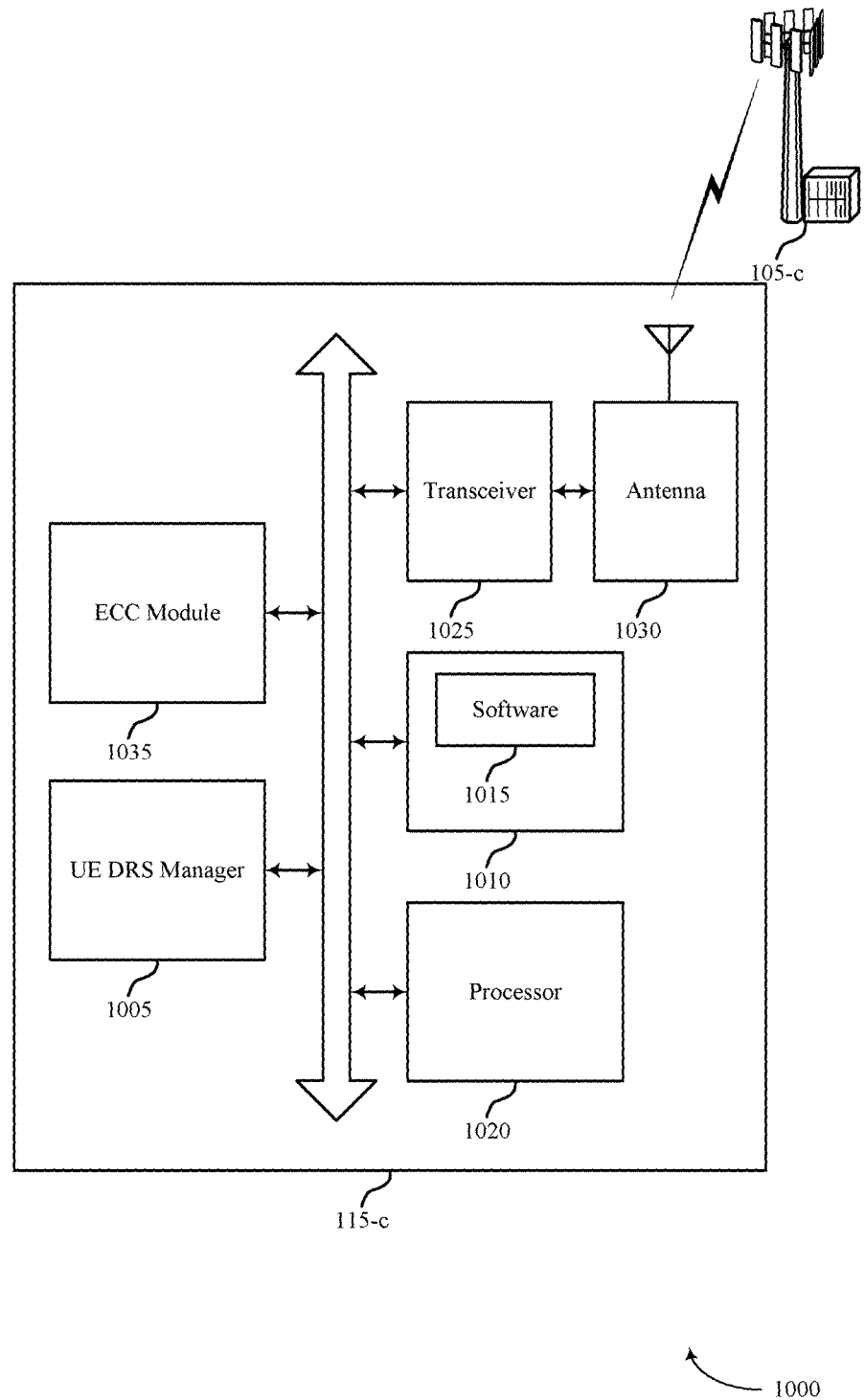
FIG. 10 illustrates a block diagram of a system including a UE that supports DRS transmission and decoding in accordance with aspects of the present disclosure.

FIG. 10 shows a diagram of a system 1000 including a device that supports DRS transmission and decoding in accordance with various aspects of the present disclosure. For example, system 1000 may include UE 115-c, which may be an example of a wireless device 700, a wireless device 800, or a UE 115 as described with reference to FIGS. 1, 2 and 7 through 9.

UE 115-c may also include UE DRS manager 1005, memory 1010, processor 1020, transceiver 1025, antenna 1030 and ECC module 1035. Each of these modules may communicate, directly or indirectly, with one another (e.g., via one or more buses). The UE DRS manager 1005 may be an example of a UE DRS manager as described with reference to FIGS. 7 through 9.

The memory 1010 may include random access memory (RAM) and read only memory (ROM). The memory 1010 may store computer-readable, computer-executable software including instructions that, when executed, cause the processor to perform various functions described herein (e.g., DRS transmission and decoding, etc.).

In some cases, the software 1015 may not be directly executable by the processor but may cause a computer (e.g., when compiled and executed) to perform functions described herein.

The processor 1020 may include an intelligent hardware device, (e.g., a central processing unit (CPU), a microcontroller, an application specific integrated circuit (ASIC), etc.)

The transceiver 1025 may communicate bi-directionally, via one or more antennas, wired, or wireless links, with one or more networks, as described above. For example, the transceiver 1025 may communicate bi-directionally with a base station 105 or a UE 115. The transceiver 1025 may also include a modem to modulate the packets and provide the modulated packets to the antennas for transmission, and to demodulate packets received from the antennas.

In some cases, the wireless device may include a single antenna 1030. However, in some cases the device may have more than one antenna 1030, which may be capable of concurrently transmitting or receiving multiple wireless transmissions.

ECC module 1035 may enable operations using enhanced component carriers (eCCs) such as communication using shared or unlicensed spectrum, using reduced TTIs or subframe durations, or using a large number of component carriers.

Figure 11:
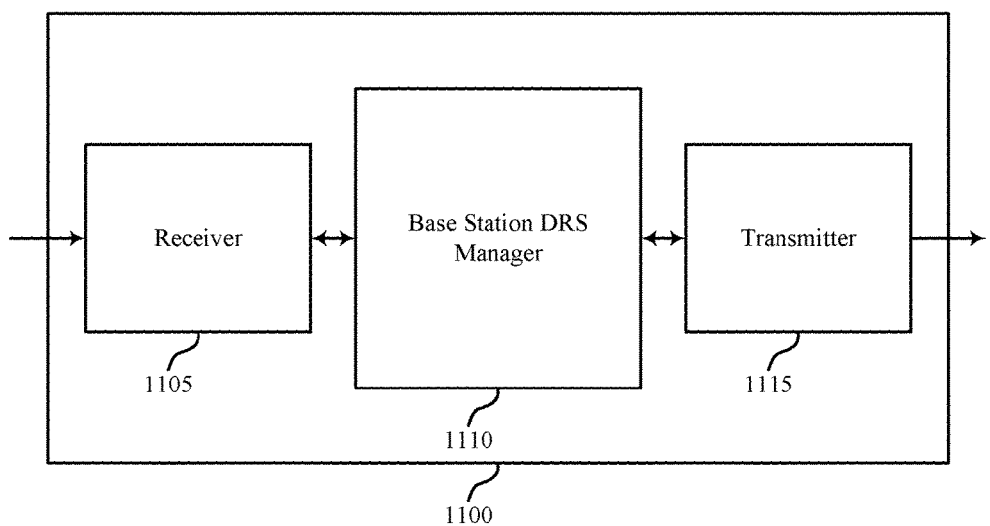
FIGS. 11 through 13 show block diagrams of a wireless device that supports DRS transmission and decoding in accordance with aspects of the present disclosure.

FIG. 11 shows a block diagram of a wireless device 1100 that supports DRS transmission and decoding in accordance with various aspects of the present disclosure. Wireless device 1100 may be an example of aspects of a base station 105 described with reference to FIGS. 1 and 2. Wireless device 1100 may include receiver 1105, base station DRS manager 1110 and transmitter 1115. Wireless device 1100 may also include a processor. Each of these components may be in communication with each other.

The receiver 1105 may receive information such as packets, user data, or control information associated with various information channels (e.g., control channels, data channels, and information related to DRS transmission and decoding, etc.). Information may be passed on to other components of the device. The receiver 1105 may be an example of aspects of the transceiver 1425 described with reference to FIG. 14.

The base station DRS manager 1110 may identify a UE capability to monitor for a DRS and a PDSCH transmission within a same subframe, and determine one or more parameters associated with at least one of a DRS transmission or PDSCH transmission based on the UE capability. The base station DRS manager 1110 may also be an example of aspects of the base station DRS manager 1405 described with reference to FIG. 14.

The transmitter 1115 may transmit signals received from other components of wireless device 1100. In some examples, the transmitter 1115 may be collocated with a receiver in a transceiver module. For example, the transmitter 1115 may be an example of aspects of the transceiver 1425 described with reference to FIG. 14. The transmitter 1115 may include a single antenna, or it may include a plurality of antennas.

Figure 12:
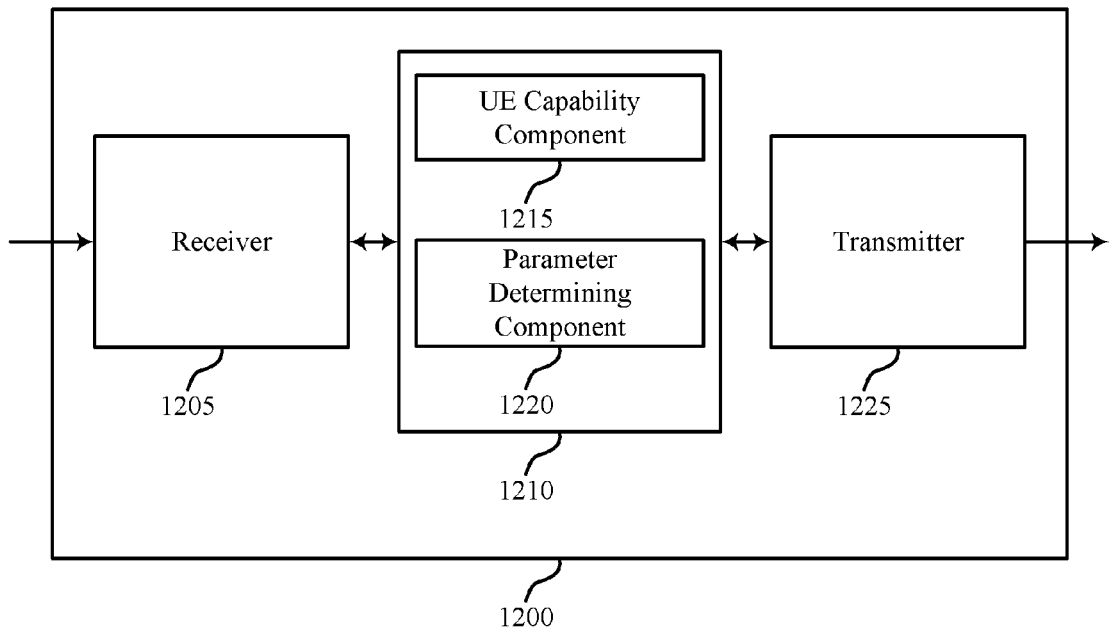

FIG. 12 shows a block diagram of a wireless device 1200 that supports DRS transmission and decoding in accordance with various aspects of the present disclosure. Wireless device 1200 may be an example of aspects of a wireless device 1100 or a base station 105 described with reference to FIGS. 1, 2 and 11. Wireless device 1200 may include receiver 1205, base station DRS manager 1210 and transmitter 1225. Wireless device 1200 may also include a processor. Each of these components may be in communication with each other.

The receiver 1205 may receive information which may be passed on to other components of the device. The receiver 1205 may also perform the functions described with reference to the receiver 1105 of FIG. 11. The receiver 1205 may be an example of aspects of the transceiver 1425 described with reference to FIG. 14.

The base station DRS manager 1210 may be an example of aspects of base station DRS manager 1110 described with reference to FIG. 11. The base station DRS manager 1210 may include UE capability component 1215 and parameter determining component 1220. The base station DRS manager 1210 may be an example of aspects of the base station DRS manager 1405 described with reference to FIG. 14.

The UE capability component 1215 may identify a UE capability to monitor for a DRS and a PDSCH transmission within a same subframe, and receive signaling from the UE indicating the UE capability.

The parameter determining component 1220 may determine one or more parameters associated with at least one of a DRS transmission or PDSCH transmission based on the UE capability. In some cases, the determining one or more parameters comprises: determining that a PDSCH transmission is transmitted in a subframe during which the UE is monitoring for DRS transmissions.

The transmitter 1225 may transmit signals received from other components of wireless device 1200. In some examples, the transmitter 1225 may be collocated with a receiver in a transceiver module. For example, the transmitter 1225 may be an example of aspects of the transceiver 1425 described with reference to FIG. 14. The transmitter 1225 may utilize a single antenna, or it may utilize a plurality of antennas.

Figure 13:
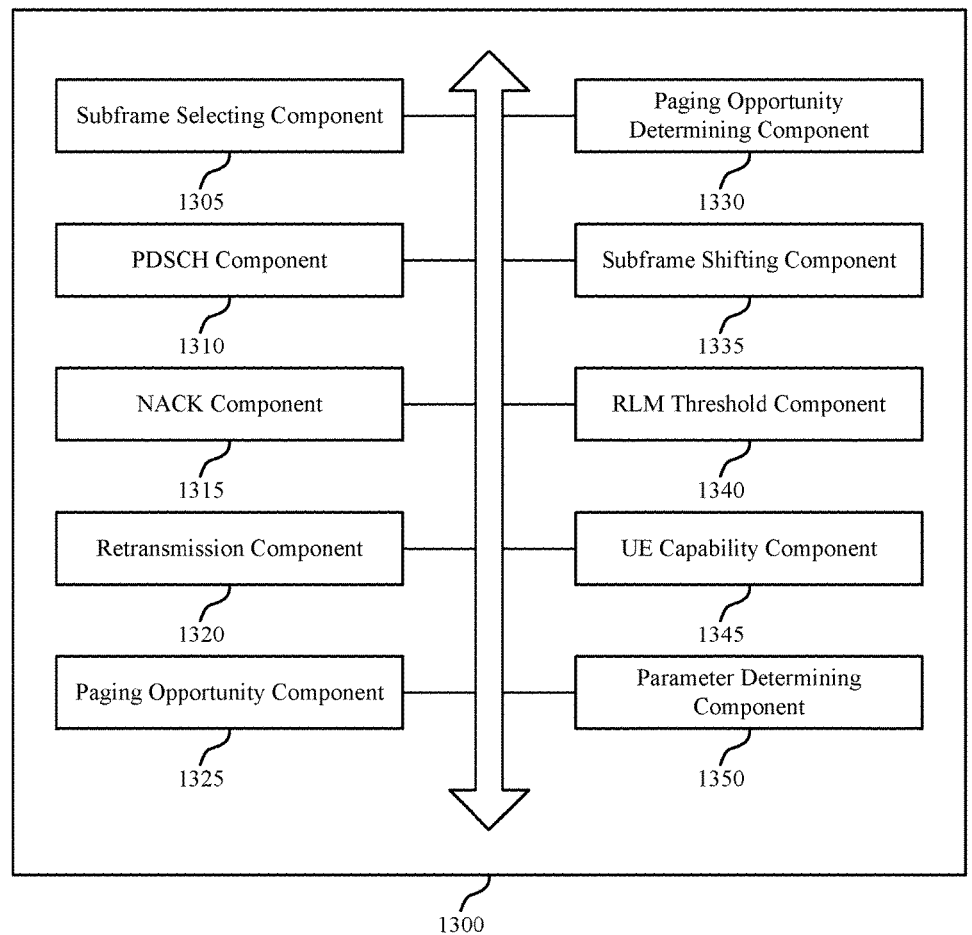

FIG. 13 shows a block diagram of a base station DRS manager 1300 which may be an example of the corresponding component of wireless device 1100 or wireless device 1200. That is, base station DRS manager 1300 may be an example of aspects of base station DRS manager 1110 or base station DRS manager 1210 described with reference to FIGS. 11 and 12. The base station DRS manager 1300 may also be an example of aspects of the base station DRS manager 1405 described with reference to FIG. 14.

The base station DRS manager 1300 may include subframe selecting component 1305, PDSCH component 1310, NACK component 1315, retransmission component 1320, paging opportunity component 1325, subframe shifting component 1335, RLM threshold component 1340, UE capability component 1345 and parameter determining component 1350. Each of these modules may communicate, directly or indirectly, with one another (e.g., via one or more buses).

The subframe selecting component 1305 may select one or more subframes within the DTxW for a paging transmission that have a same scrambling sequence as the DRS transmission. In some cases, the determining one or more parameters comprises: selecting a subframe for DRS transmission based on the UE capability. In some cases, the selecting a subframe for DRS transmission comprises selecting a subframe having a same scrambling sequence as used for the DRS transmission.

In some cases, the selecting a subframe for DRS transmission comprises selecting a first subframe within a DTxW for DRS transmission. In some cases, the determining one or more parameters further comprises: selecting a DRS subframe within a DTxW for DRS transmission that is subsequent to one or more other subframes within the DTxW. In some cases, the determining one or more parameters comprises: selecting one or more subframes for a paging transmission that is outside of a DTxW.

The PDSCH component 1310 may transmit PDSCH transmissions in the one or more other subframes. The NACK component 1315 may receive a negative acknowledgment (NACK) for the PDSCH transmissions in the one or more other subframes, and discount the NACK in a link adaptation procedure based on the UE capability.

The retransmission component 1320 may retransmit the PDSCH transmission based on determining that the PDSCH transmission is transmitted in the subframe during which the UE is monitoring for DRS transmissions and the UE capability.

The paging opportunity component 1325 may determine that a paging opportunity overlaps with a DTxW. In some cases, the paging opportunity comprising a set of subframes for transmission of the paging message. The subframe shifting component 1335 may shift the set of subframes for transmission of the paging message to be non-overlapping with the DTxW. In some cases, shifting the set of subframes to be monitored for the paging message to be non-overlapping with the DTxW comprises: shifting the set of subframes to start a determined number of subframes following the DRS transmission, the start of the DTxW, or the start of the paging opportunity. In some cases, the determined number of subframes is based on a UE specific identifier, a starting subframe number of the paging opportunity, or a combination thereof.

The RLM threshold component 1340 may modify an RLM threshold based on the UE capability. The UE capability component 1345 may identify a UE capability to monitor for a DRS and a PDSCH transmission within a same subframe, and receive signaling from the UE indicating the UE capability. The parameter determining component 1350 may determine one or more parameters associated with at least one of a DRS transmission or PDSCH transmission based on the UE capability.

Figure 14:
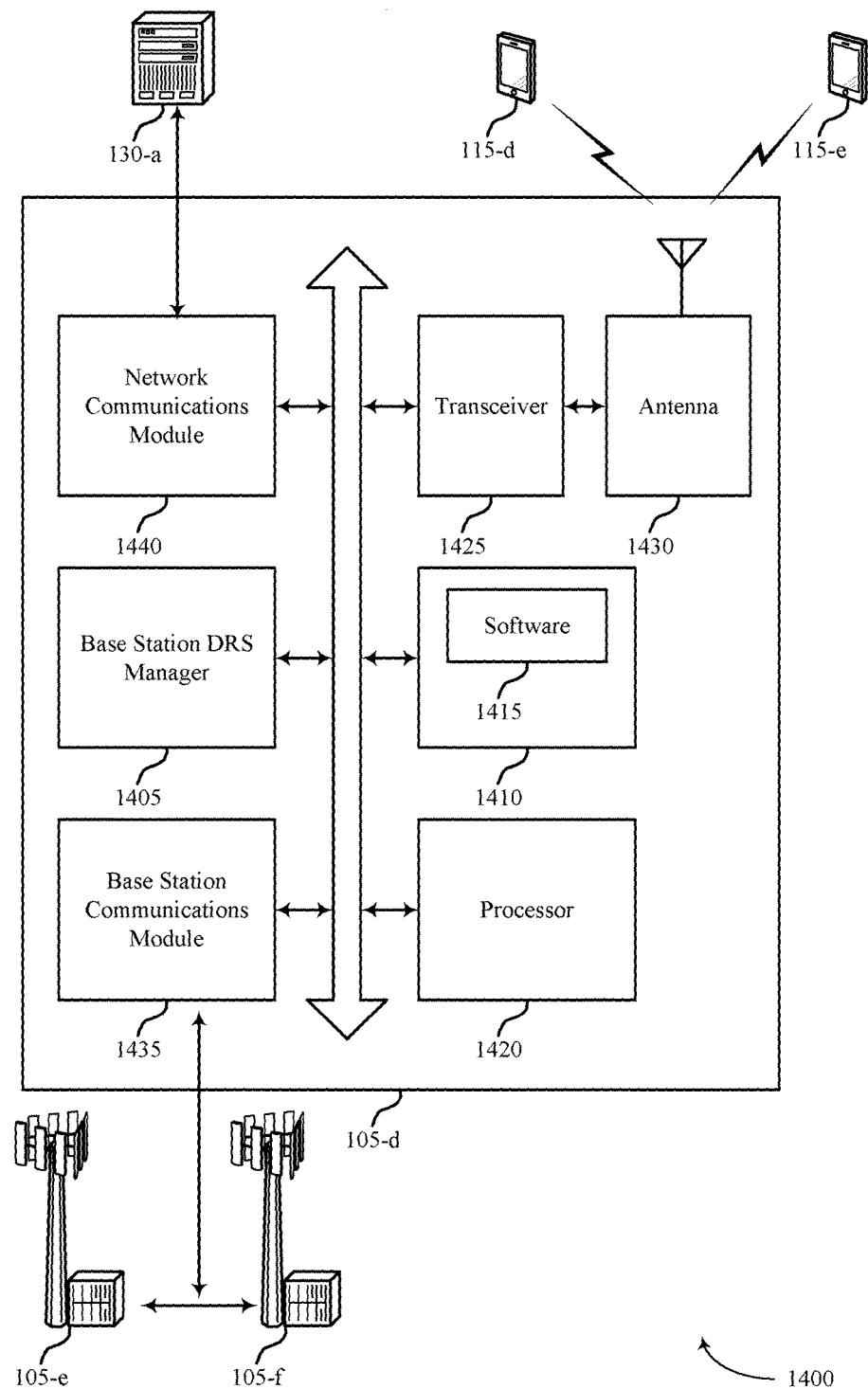
FIG. 14 illustrates a block diagram of a system including a base station that supports DRS transmission and decoding in accordance with aspects of the present disclosure.

FIG. 14 shows a diagram of a wireless system 1400 including a device configured that supports DRS transmission and decoding in accordance with various aspects of the present disclosure. For example, system 1400 may include base station 105-d, which may be an example of a wireless device 1100, a wireless device 1200, or a base station 105 as described with reference to FIGS. 1, 2 and 11 through 13. Base station 105-d may also include components for bi-directional voice and data communications including components for transmitting communications and components for receiving communications. For example, base station 105-d may communicate bi-directionally with one or more UEs 115.

Base station 105-d may also include base station DRS manager 1405, memory 1410, processor 1420, transceiver 1425, antenna 1430, base station communications module 1435 and network communications module 1440. Each of these modules may communicate, directly or indirectly, with one another (e.g., via one or more buses). The base station DRS manager 1405 may be an example of a base station DRS manager as described with reference to FIGS. 11 through 13.

The memory 1410 may include RAM and ROM. The memory 1410 may store computer-readable, computer-executable software including instructions that, when executed, cause the processor to perform various functions described herein (e.g., DRS transmission and decoding, etc.). In some cases, the software 1415 may not be directly executable by the processor but may cause a computer (e.g., when compiled and executed) to perform functions described herein. The processor 1420 may include an intelligent hardware device, (e.g., a CPU, a microcontroller, an ASIC, etc.)

The transceiver 1425 may communicate bi-directionally, via one or more antennas, wired, or wireless links, with one or more networks, as described above. For example, the transceiver 1425 may communicate bi-directionally with a base station 105 or a UE 115. The transceiver 1425 may also include a modem to modulate the packets and provide the modulated packets to the antennas for transmission, and to demodulate packets received from the antennas. In some cases, the wireless device may include a single antenna 1430. However, in some cases the device may have more than one antenna 1030, which may be capable of concurrently transmitting or receiving multiple wireless transmissions.

The base station communications module 1435 may manage communications with other base station 105, and may include a controller or scheduler for controlling communications with UEs 115 in cooperation with other base stations 105. For example, the base station communications module 1435 may coordinate scheduling for transmissions to UEs 115 for various interference mitigation techniques such as beamforming or joint transmission. In some examples, base station communications module 1435 may provide an X2 interface within an LTE/LTE-A wireless communication network technology to provide communication between base stations 105.

The network communications module 1440 may manage communications with the core network (e.g., via one or more wired backhaul links). For example, the network communications module 1440 may manage the transfer of data communications for client devices, such as one or more UEs 115.

Figure 15:
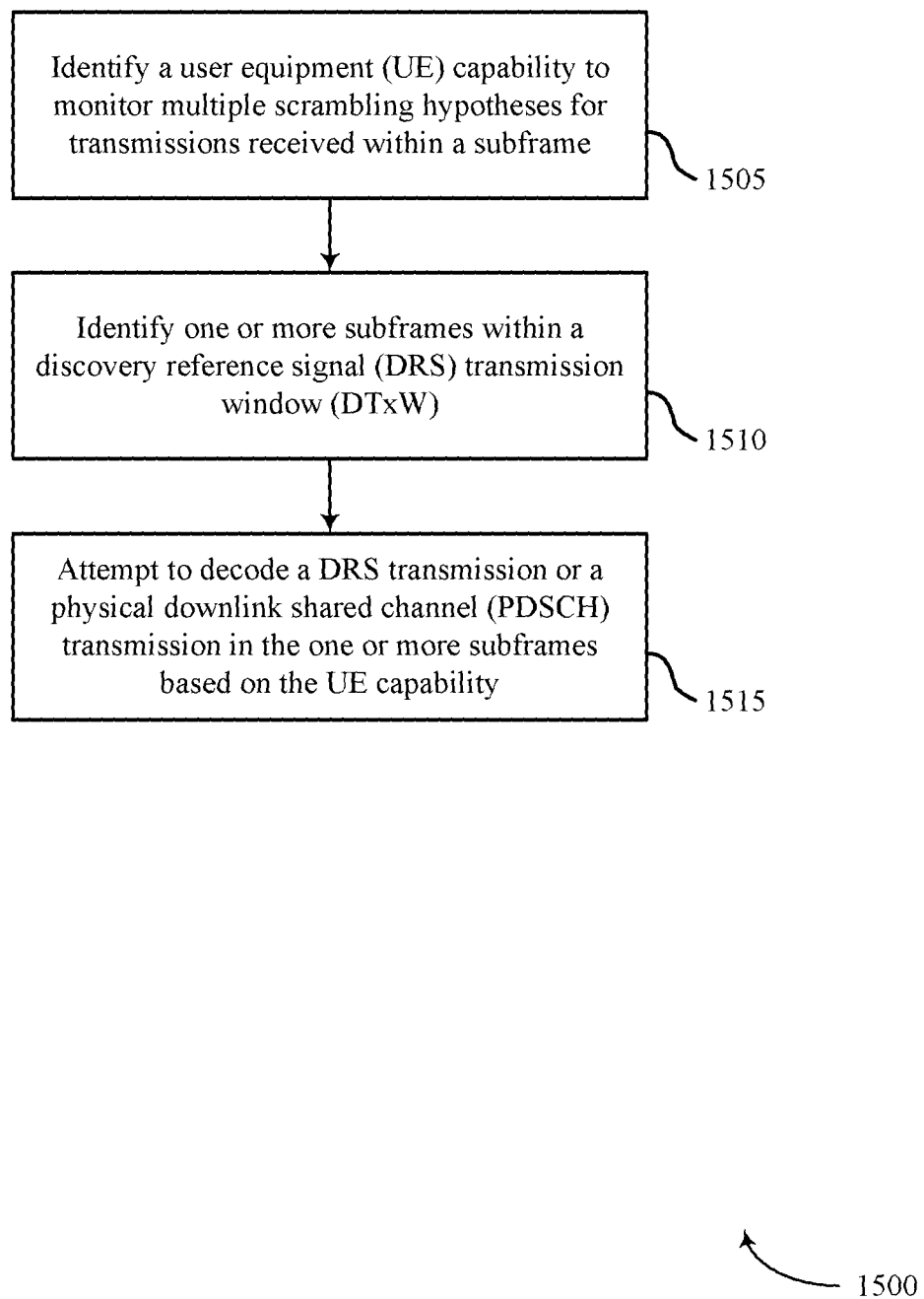
FIGS. 15 through 22 illustrate methods for DRS transmission and decoding in accordance with aspects of the present disclosure.

FIG. 15 shows a flowchart illustrating a method 1500 for DRS transmission and decoding in accordance with various aspects of the present disclosure. The operations of method 1500 may be implemented by a device such as a UE 115 or its components as described with reference to FIGS. 1 and 2. For example, the operations of method 1500 may be performed by the UE DRS manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may identify a UE capability to monitor multiple scrambling hypotheses for transmissions received within a subframe as described above with reference to FIGS. 2 through 6. In certain examples, the operations of block 1505 may be performed by the UE capability component as described with reference to FIGS. 8 and 9.

At block 1510, the UE 115 may identify one or more subframes within a DTxW as described above with reference to FIGS. 2 through 6. In certain examples, the operations of block 1510 may be performed by the subframe identifying component as described with reference to FIGS. 8 and 9.

At block 1515, the UE 115 may attempt to decode a DRS transmission or a PDSCH transmission in the one or more subframes based on the UE capability as described above with reference to FIGS. 2 through 6. In certain examples, the operations of block 1515 may be performed by the decoder as described with reference to FIGS. 8 and 9.

Figure 16:
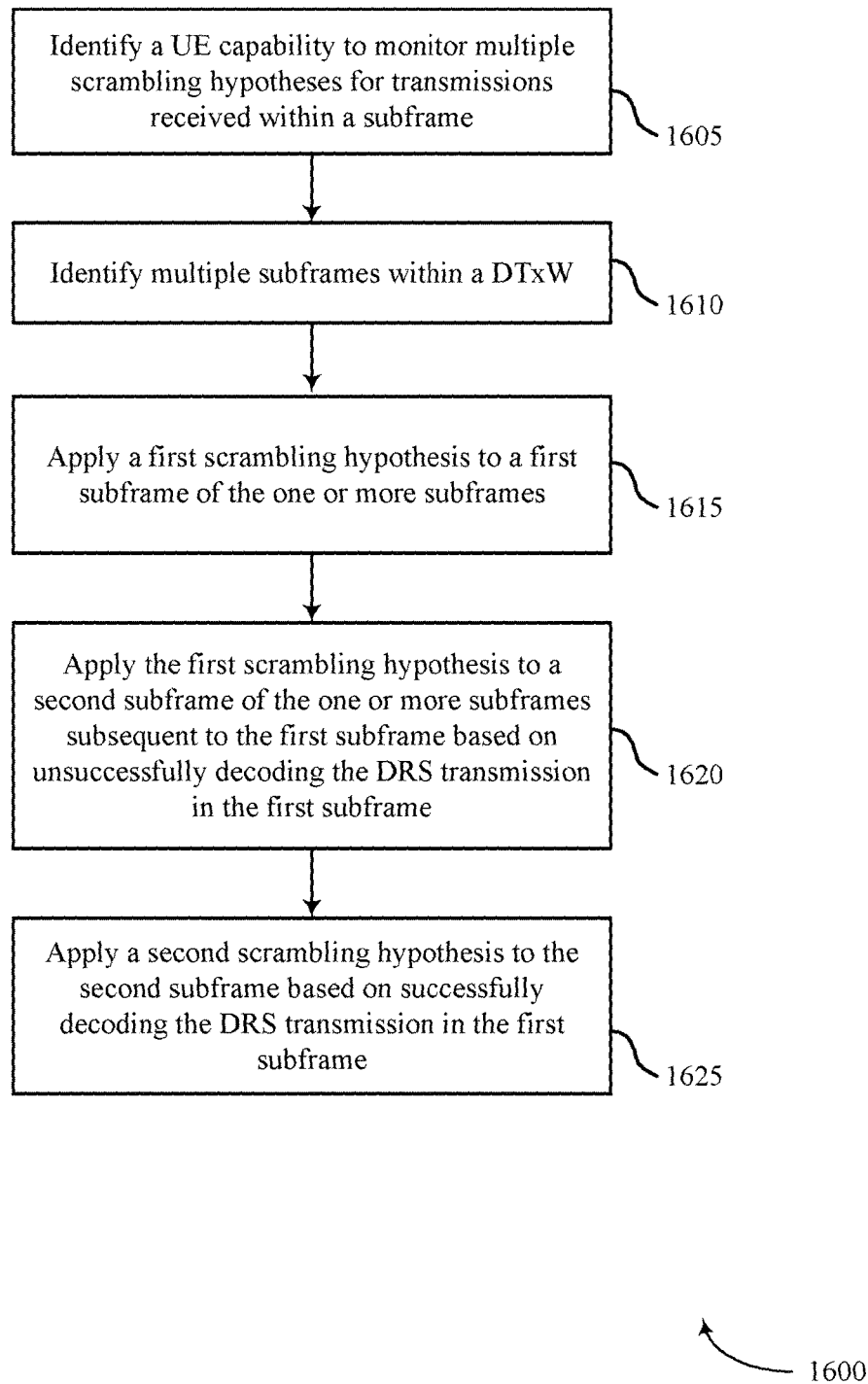

FIG. 16 shows a flowchart illustrating a method 1600 for DRS transmission and decoding in accordance with various aspects of the present disclosure. The operations of method 1600 may be implemented by a device such as a UE 115 or its components as described with reference to FIGS. 1 and 2. For example, the operations of method 1600 may be performed by the UE DRS manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may identify a UE capability to monitor multiple scrambling hypotheses for transmissions received within a subframe as described above with reference to FIGS. 2 through 6. In certain examples, the operations of block 1605 may be performed by the UE capability component as described with reference to FIGS. 8 and 9.

At block 1610, the UE 115 may identify one or more subframes within a DTxW as described above with reference to FIGS. 2 through 6. In certain examples, the operations of block 1610 may be performed by the subframe identifying component as described with reference to FIGS. 8 and 9.

At block 1615, the UE 115 may apply a first scrambling hypothesis to a first subframe of the one or more subframes as described above with reference to FIGS. 2 through 6. In certain examples, the operations of block 1615 may be performed by the decoder as described with reference to FIGS. 8 and 9.

At block 1620, the UE 115 may apply the first scrambling hypothesis to a second subframe of the one or more subframes subsequent to the first subframe based on unsuccessfully decoding the DRS transmission in the first subframe as described above with reference to FIGS. 2 through 6. In certain examples, the operations of block 1620 may be performed by the decoder as described with reference to FIGS. 8 and 9.

At block 1625, the UE 115 may apply a second scrambling hypothesis to the second subframe based on successfully decoding the DRS transmission in the first subframe as described above with reference to FIGS. 2 through 6. In certain examples, the operations of block 1625 may be performed by the decoder as described with reference to FIGS. 8 and 9.

Figure 17:
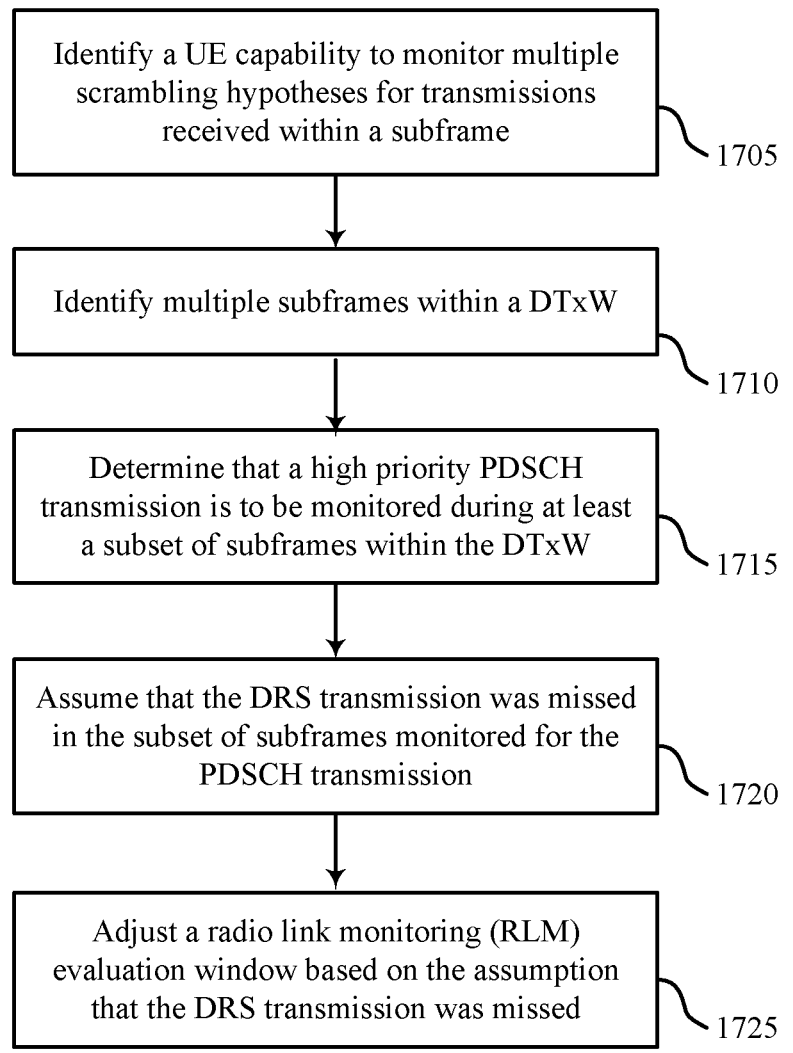

FIG. 17 shows a flowchart illustrating a method 1700 for DRS transmission and decoding in accordance with various aspects of the present disclosure. The operations of method 1700 may be implemented by a device such as a UE 115 or its components as described with reference to FIGS. 1 and 2. For example, the operations of method 1700 may be performed by the UE DRS manager as described herein. In some examples, the UE 115 may execute a set of codes to control the functional elements of the device to perform the functions described below. Additionally or alternatively, the UE 115 may perform aspects the functions described below using special-purpose hardware.

At block 1705, the UE 115 may identify a UE capability to monitor multiple scrambling hypotheses for transmissions received within a subframe as described above with reference to FIGS. 2 through 6. In certain examples, the operations of block 1705 may be performed by the UE capability component as described with reference to FIGS. 8 and 9.

At block 1710, the UE 115 may identify one or more subframes within a DTxW as described above with reference to FIGS. 2 through 6. In certain examples, the operations of block 1710 may be performed by the subframe identifying component as described with reference to FIGS. 8 and 9.

At block 1715, the UE 115 may determine that a high priority PDSCH transmission is to be monitored during at least a subset of subframes within the DTxW as described above with reference to FIGS. 2 through 6. In certain examples, the operations of block 1715 may be performed by the priority transmission component as described with reference to FIGS. 8 and 9.

At block 1720, the UE 115 may assume that the DRS transmission was missed in the subset of subframes monitored for the high priority PDSCH transmission as described above with reference to FIGS. 2 through 6. In certain examples, the operations of block 1720 may be performed by the missed DRS component as described with reference to FIGS. 8 and 9.

At block 1725, the UE 115 may adjust an RLM evaluation window based on the assumption that the DRS transmission was missed as described above with reference to FIGS. 2 through 6. In certain examples, the operations of block 1725 may be performed by the RLM window component as described with reference to FIGS. 8 and 9.

Figure 18:
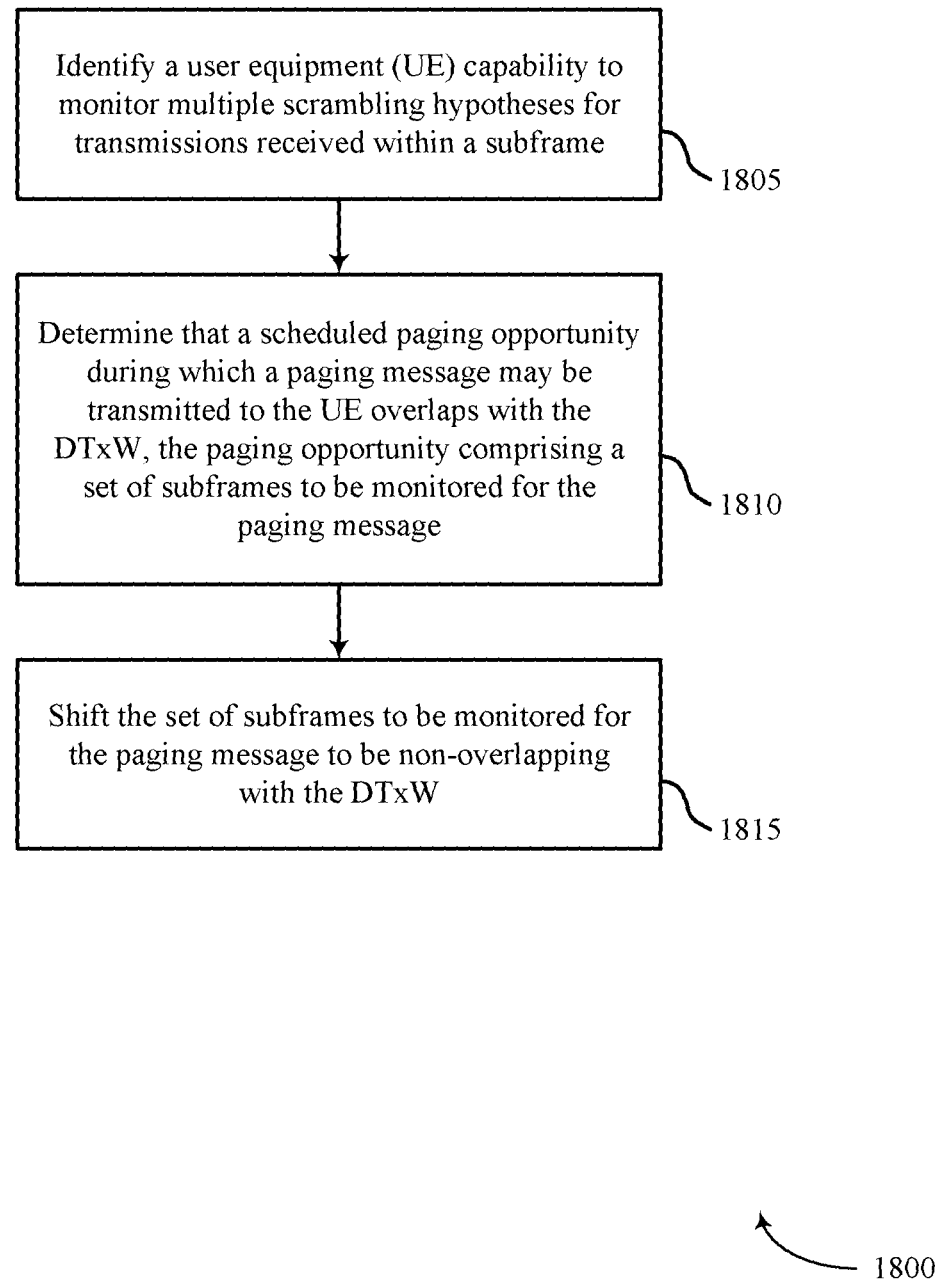

FIG. 18 shows a flowchart illustrating a method 1800 for DRS transmission and decoding in accordance with various aspects of the present disclosure. The operations of method 1800 may be implemented by a device such as a UE 115 or its components as described with reference to FIGS. 1 and 2. For example, the operations of method 1800 may be performed by the UE DRS manager as described herein. In some examples, the UE 115 may execute a set of codes to control the functional elements of the device to perform the functions described below. Additionally or alternatively, the UE 115 may perform aspects the functions described below using special-purpose hardware.

At block 1805, the UE 115 may identify a UE capability to monitor multiple scrambling hypotheses for transmissions received within a subframe as described above with reference to FIGS. 2 through 6. In certain examples, the operations of block 1805 may be performed by the UE capability component as described with reference to FIGS. 8 and 9.

At block 1810, the UE 115 may determine that a scheduled paging opportunity during which a paging message may be transmitted to the UE overlaps with the DTxW, the paging opportunity comprising a set of subframes to be monitored for the paging message as described above with reference to FIGS. 2 through 6. In certain examples, the operations of block 1810 may be performed by the paging opportunity component as described with reference to FIGS. 8 and 9.

At block 1815, the UE 115 may shift the set of subframes to be monitored for the paging message to be non-overlapping with the DTxW as described above with reference to FIGS. 2 through 6. In certain examples, the operations of block 1815 may be performed by the subframe shifting component as described with reference to FIGS. 8 and 9.

Figure 19:
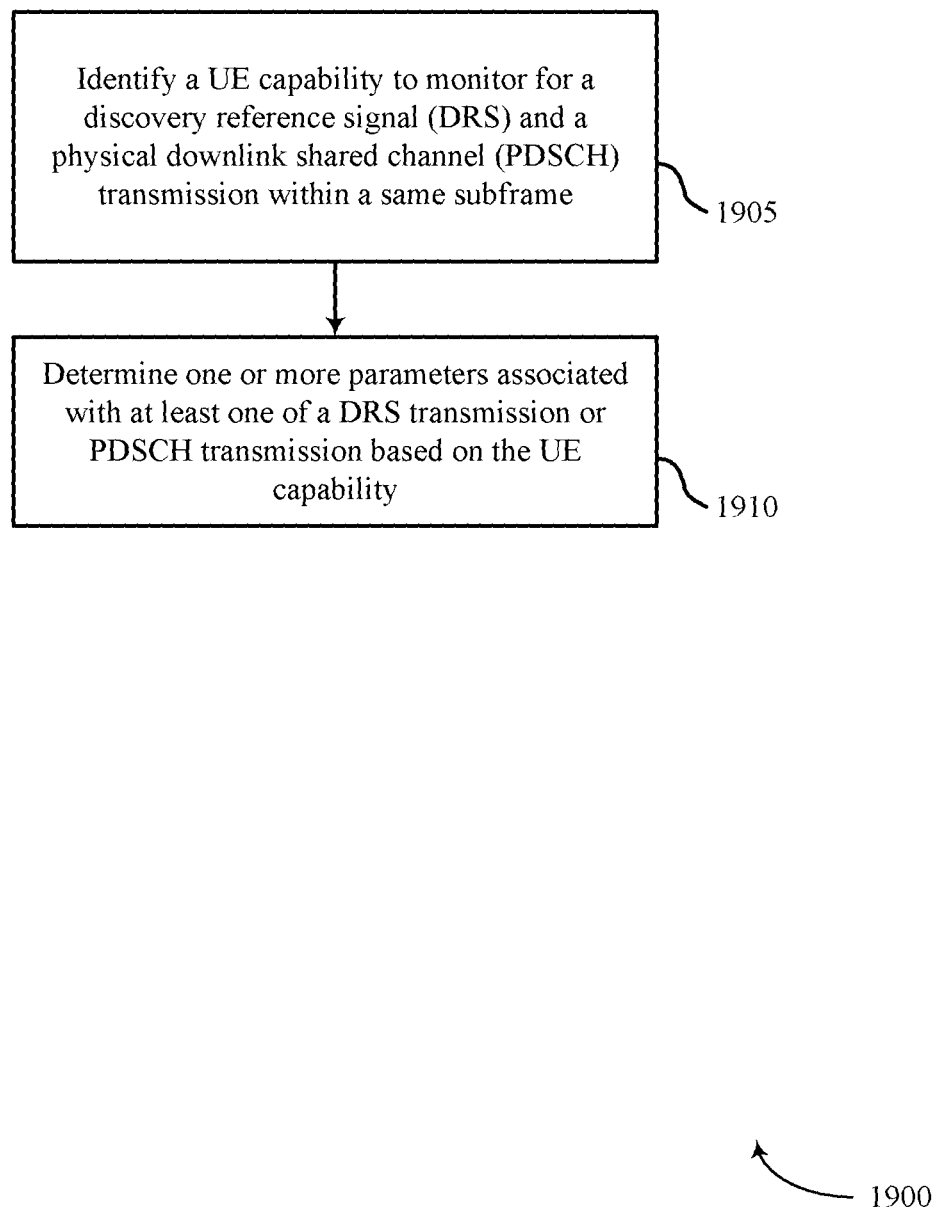

FIG. 19 shows a flowchart illustrating a method 1900 for DRS transmission and decoding in accordance with various aspects of the present disclosure. The operations of method 1900 may be implemented by a device such as a base station 105 or its components as described with reference to FIGS. 1 and 2. For example, the operations of method 1900 may be performed by the base station DRS manager as described herein. In some examples, the base station 105 may execute a set of codes to control the functional elements of the device to perform the functions described below. Additionally or alternatively, the base station 105 may perform aspects the functions described below using special-purpose hardware.

At block 1905, the base station 105 may identify a UE capability to monitor for a DRS and a PDSCH transmission within a same subframe as described above with reference to FIGS. 2 through 6. In certain examples, the operations of block 1905 may be performed by the UE capability component as described with reference to FIGS. 12 and 13.

At block 1910, the base station 105 may determine one or more parameters associated with at least one of a DRS transmission or PDSCH transmission based on the UE capability as described above with reference to FIGS. 2 through 6. In certain examples, the operations of block 1910 may be performed by the parameter determining component as described with reference to FIGS. 12 and 13.

Figure 20:
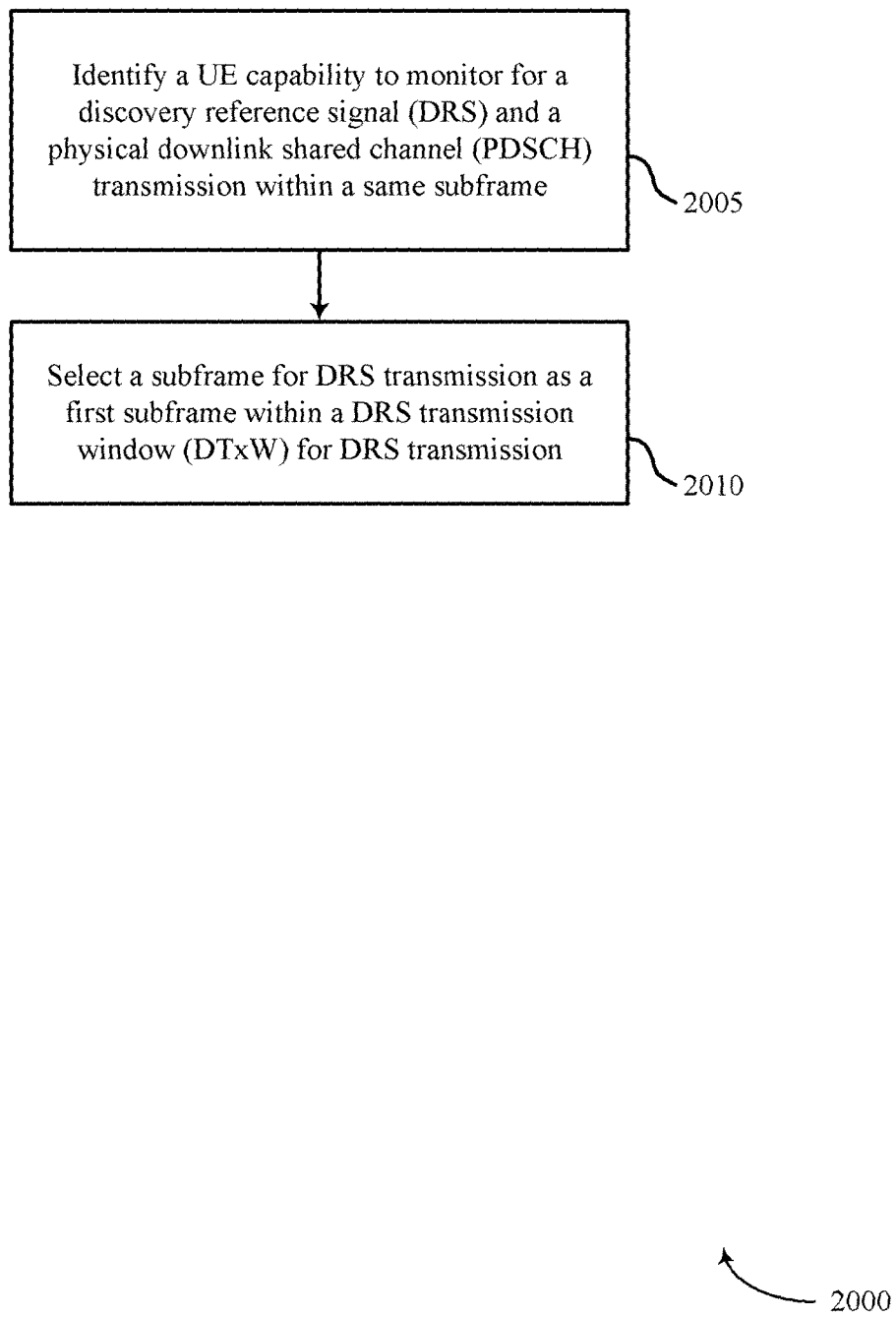

FIG. 20 shows a flowchart illustrating a method 2000 for DRS transmission and decoding in accordance with various aspects of the present disclosure. The operations of method 2000 may be implemented by a device such as a base station 105 or its components as described with reference to FIGS. 1 and 2. For example, the operations of method 2000 may be performed by the base station DRS manager as described herein. In some examples, the base station 105 may execute a set of codes to control the functional elements of the device to perform the functions described below. Additionally or alternatively, the base station 105 may perform aspects the functions described below using special-purpose hardware.

At block 2005, the base station 105 may identify a UE capability to monitor for a DRS and a PDSCH transmission within a same subframe as described above with reference to FIGS. 2 through 6. In certain examples, the operations of block 2005 may be performed by the UE capability component as described with reference to FIGS. 12 and 13.

At block 2010, the base station 105 may select a subframe for DRS transmission as a first subframe within a DRS transmission window (DTxW) for DRS transmission as described above with reference to FIGS. 2 through 6. In certain examples, the operations of block 2010 may be performed by the subframe selecting component as described with reference to FIGS. 12 and 13.

Figure 21:
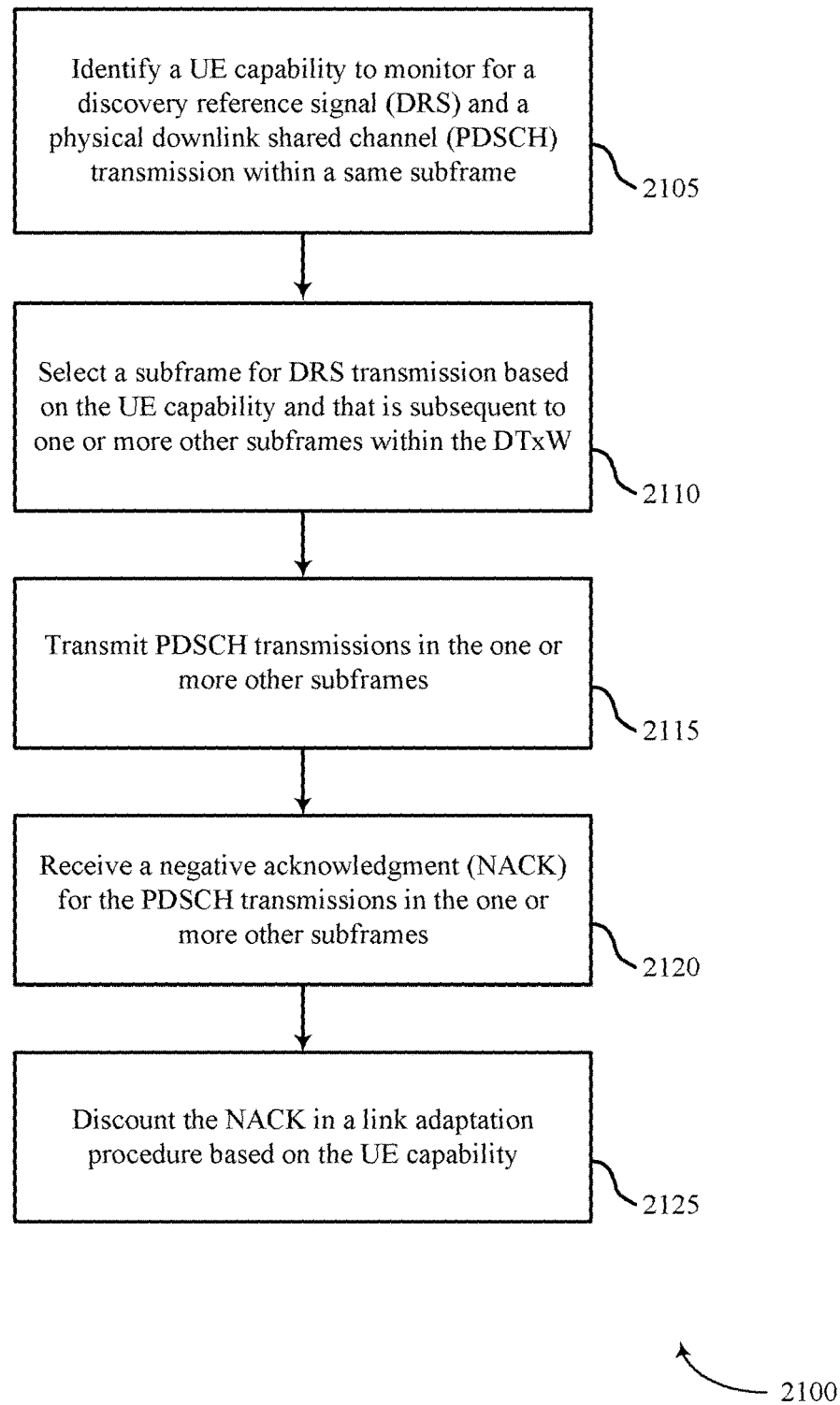

FIG. 21 shows a flowchart illustrating a method 2100 for DRS transmission and decoding in accordance with various aspects of the present disclosure. The operations of method 2100 may be implemented by a device such as a base station 105 or its components as described with reference to FIGS. 1 and 2. For example, the operations of method 2100 may be performed by the base station DRS manager as described herein. In some examples, the base station 105 may execute a set of codes to control the functional elements of the device to perform the functions described below. Additionally or alternatively, the base station 105 may perform aspects the functions described below using special-purpose hardware.

At block 2105, the base station 105 may identify a UE capability to monitor for a DRS and a PDSCH transmission within a same subframe as described above with reference to FIGS. 2 through 6. In certain examples, the operations of block 2105 may be performed by the UE capability component as described with reference to FIGS. 12 and 13.

At block 2110, the base station 105 may select a subframe for DRS transmission based on the UE capability and that is subsequent to one or more other subframes within the DTxW as described above with reference to FIGS. 2 through 6. In certain examples, the operations of block 2110 may be performed by the parameter determining component as described with reference to FIGS. 12 and 13.

At block 2115, the base station 105 may transmit PDSCH transmissions in the one or more other subframes as described above with reference to FIGS. 2 through 6. In certain examples, the operations of block 2115 may be performed by the PDSCH component as described with reference to FIGS. 12 and 13.

At block 2120, the base station 105 may receive a negative acknowledgment (NACK) for the PDSCH transmissions in the one or more other subframes as described above with reference to FIGS. 2 through 6. In certain examples, the operations of block 2120 may be performed by the NACK component as described with reference to FIGS. 12 and 13.

At block 2125, the base station 105 may discount the NACK in a link adaptation procedure based on the UE capability as described above with reference to FIGS. 2 through 6. In certain examples, the operations of block 2125 may be performed by the NACK component as described with reference to FIGS. 12 and 13.

At block 2130, the base station 105 may the determining one or more parameters comprises: selecting a subframe for DRS transmission based on the UE capability as described above with reference to FIGS. 2 through 6. In certain examples, the operations of block 2130 may be performed by the subframe selecting component as described with reference to FIGS. 12 and 13.

At block 2135, the base station 105 may the determining one or more parameters further comprises: selecting a DRS subframe within a DTxW for DRS transmission that is subsequent to one or more other subframes within the DTxW as described above with reference to FIGS. 2 through 6. In certain examples, the operations of block 2135 may be performed by the subframe selecting component as described with reference to FIGS. 12 and 13.

Figure 22:
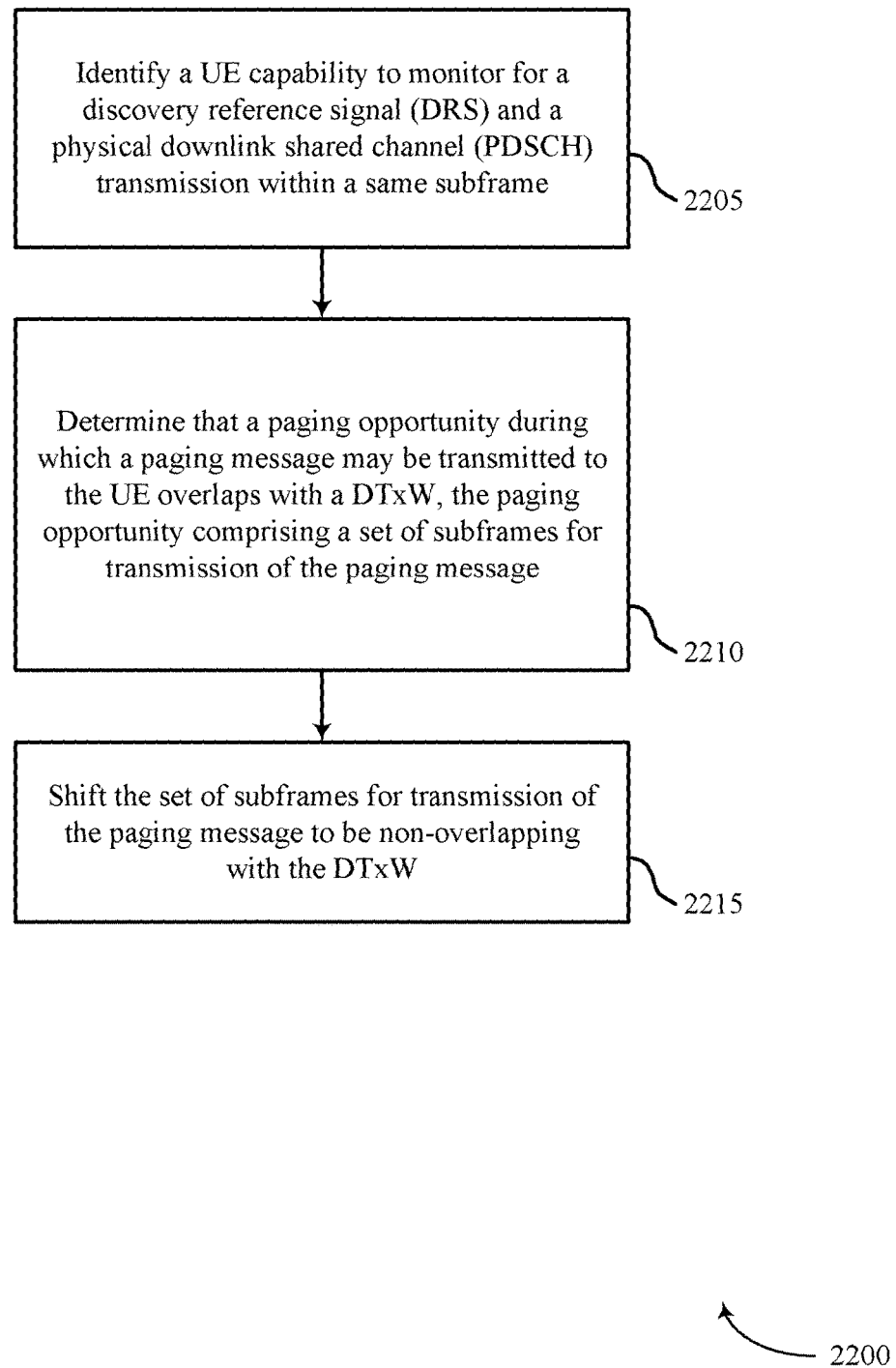

FIG. 22 shows a flowchart illustrating a method 2200 for DRS transmission and decoding in accordance with various aspects of the present disclosure. The operations of method 2200 may be implemented by a device such as a base station 105 or its components as described with reference to FIGS. 1 and 2. For example, the operations of method 2200 may be performed by the base station DRS manager as described herein. In some examples, the base station 105 may execute a set of codes to control the functional elements of the device to perform the functions described below. Additionally or alternatively, the base station 105 may perform aspects the functions described below using special-purpose hardware.

At block 2205, the base station 105 may identify a UE capability to monitor for a DRS and a PDSCH transmission within a same subframe as described above with reference to FIGS. 2 through 6. In certain examples, the operations of block 2205 may be performed by the UE capability component as described with reference to FIGS. 12 and 13.

At block 2210, the base station 105 may determine that a paging opportunity during which a paging message may be transmitted to the UE overlaps with a DTxW as described above with reference to FIGS. 2 through 6. In some cases, the paging opportunity comprises a set of subframes for transmission of the paging message. In certain examples, the operations of block 2210 may be performed by the parameter determining component as described with reference to FIGS. 12 and 13.

At block 2215, the base station 105 may shift the set of subframes for transmission of the paging message to be non-overlapping with the DTxW as described above with reference to FIGS. 2 through 6. In certain examples, the operations of block 2215 may be performed by the subframe shifting component as described with reference to FIGS. 12 and 13.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for DRS transmission and decoding.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for DRS transmission and decoding. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

What is claimed is:

1. A method for wireless communications, comprising:
   identifying a user equipment (UE) capability to monitor multiple scrambling hypotheses for transmissions received within a subframe;
   identifying one or more subframes within a discovery reference signal (DRS) transmission window; and
   attempting to decode one or more of: a DRS transmission, or a physical downlink shared channel (PDSCH) transmission, or both, in the one or more subframes based at least in part on the UE capability.

2. The method of claim 1, wherein attempting to decode one or more of: the DRS transmission, or the PDSCH transmission, or both, comprises:
   applying a first scrambling hypothesis to a first subframe of the one or more subframes;
   attempting to decode the DRS transmission in the first subframe;
   applying the first scrambling hypothesis to a second subframe of the one or more subframes subsequent to the first subframe based at least in part on unsuccessfully decoding the DRS transmission in the first subframe; and
   applying a second scrambling hypothesis to the second subframe based at least in part on successfully decoding the DRS transmission in the first subframe.

3. The method of claim 1, further comprising:
   determining that a high priority PDSCH transmission is to be monitored during at least a subset of subframes within the DRS transmission window; and
   wherein attempting to decode one or more of: the DRS transmission, or the PDSCH transmission, or both comprises:
   identifying a distinct scrambling hypothesis for each subframe within the subset of subframes to be monitored for the high priority PDSCH transmission; and
   attempting to decode one or more subframes within the subset of subframes based at least in part on the distinct scrambling hypothesis associated with each of the one or more subframes within the subset.

4. The method of claim 3, wherein attempting to decode one or more of: the DRS transmission, or the PDSCH transmission, or both, further comprises, for each subframe in the DRS transmission window:
   determining, at each subframe in the DRS transmission window, that the DRS transmission was not previously successfully decoded in the DRS transmission window;

determining that the subframe is not to be monitored for a high priority PDSCH transmission; and attempting to decode the DRS transmission using a same scrambling hypothesis as prior attempted decode of the DRS transmission in the DRS transmission window.

5. The method of claim 4, wherein the same scrambling hypothesis used for attempting to decode the DRS transmission corresponds to a scrambling hypothesis for subframe zero or subframe five of a radio frame.

6. The method of claim 1, further comprising:
determining that the DRS transmission could have been missed in a subset of subframes monitored for PDSCH transmission; and
adjusting a block error rate (BLER) weighting based at least in part on an assumption that the DRS transmission was missed.

7. The method of claim 1, further comprising:
determining that the DRS transmission could have been missed in a subset of subframes monitored for PDSCH transmission; and
adjusting a radio link monitoring (RLM) evaluation window based at least in part on an assumption that the DRS transmission was missed.

8. The method of claim 1, wherein attempting to decode one or more of: the DRS transmission, or the PDSCH transmission, or both, comprises:
applying a first scrambling hypothesis to a first subset of subframes within the DRS transmission window until the DRS transmission is successfully detected;
applying a second scrambling hypothesis to each of one or more subframes of a second subset of subframes within the DRS transmission window to attempt to decode the PDSCH transmission, wherein the second subset is subsequent to the first subset of subframes; and
signaling to a base station that the first subset of subframes were not monitored for the PDSCH transmission.

9. The method of claim 1, wherein the DRS transmission window is a first DRS transmission window, and wherein attempting to decode one or more of: the DRS transmission, or the PDSCH transmission, or both, comprises attempting to decode the DRS transmission in subframes of the first DRS transmission window, and wherein the method further comprises:
identifying one or more subframes within a second DRS transmission window; and
attempting to decode the PDSCH transmission in the one or more subframes of the second DRS transmission window.

10. The method of claim 1, further comprising:
determining that a scheduled paging opportunity during which a paging message may be transmitted to the UE overlaps with the DRS transmission window, the paging opportunity comprising a set of subframes to be monitored for the paging message; and
shifting the set of subframes to be monitored for the paging message to be non-overlapping with the DRS transmission window.

11. The method of claim 10, wherein shifting the set of subframes to be monitored for the paging message to be non-overlapping with the DRS transmission window comprises:
shifting the set of subframes to start a determined number of subframes following the DRS transmission, the start of the DRS transmission window, or the start of the scheduled paging opportunity.

12. The method of claim 11, wherein the determined number of subframes is based at least in part on a UE specific identifier, a starting subframe number of the paging opportunity, or a combination thereof.

13. The method of claim 1, further comprising:
signaling the UE capability to a base station.

14. An apparatus for wireless communication, comprising:
a processor;
memory in electronic communication with the processor; and
instructions stored in the memory and operable, when executed by the processor, to cause the apparatus to:
identify a user equipment (UE) capability to monitor multiple scrambling hypotheses for transmissions received within a subframe;
identify one or more subframes within a discovery reference signal (DRS) transmission window; and
attempt to decode one or more of: a DRS transmission, or a physical downlink shared channel (PDSCH) transmission, or both, in the one or more subframes based at least in part on the UE capability.

15. The apparatus of claim 14, wherein the instructions are executable by the processor to cause the apparatus to:
apply a first scrambling hypothesis to a first subframe of the one or more subframes;
attempt to decode the DRS transmission in the first subframe;
apply the first scrambling hypothesis to a second subframe of the one or more subframes subsequent to the first subframe based at least in part on unsuccessfully decoding the DRS transmission in the first subframe; and
apply a second scrambling hypothesis to the second subframe based at least in part on successfully decoding the DRS transmission in the first subframe.

16. The apparatus of claim 14, wherein the instructions are executable by the processor to cause the apparatus to:
determine that a high priority PDSCH transmission is to be monitored during at least a subset of subframes within the DRS transmission window;
identify a distinct scrambling hypothesis for each subframe within the subset of subframes to be monitored for the high priority PDSCH transmission; and
attempt to decode one or more subframes within the subset of subframes based at least in part on the distinct scrambling hypothesis associated with each of the one or more subframes within the subset.

17. The apparatus of claim 16, wherein the instructions are executable by the processor to cause the apparatus to, for each subframe in the DRS transmission window:
determine, at each subframe in the DRS transmission window, that the DRS transmission was not previously successfully decoded in the DRS transmission window;
determine that the subframe is not to be monitored for a high priority PDSCH transmission; and
attempt to decode the DRS transmission using a same scrambling hypothesis as prior attempted decode of the DRS transmission in the DRS transmission window.

18. The apparatus of claim 17, wherein the same scrambling hypothesis used for attempting to decode the DRS transmission corresponds to a scrambling hypothesis for subframe zero or subframe five of a radio frame.

19. The apparatus of claim 14, wherein the instructions are executable by the processor to cause the apparatus to:

determine that the DRS transmission could have been missed in a subset of subframes monitored for PDSCH transmission; and adjust a block error rate (BLER) weighting based at least in part on an assumption that the DRS transmission was missed.

20. The apparatus of claim 14, wherein the instructions are executable by the processor to cause the apparatus to:
determine that the DRS transmission could have been missed in a subset of subframes monitored for PDSCH transmission; and
adjust a radio link monitoring (RLM) evaluation window based at least in part on an assumption that the DRS transmission was missed.

21. The apparatus of claim 14, wherein the instructions are executable by the processor to cause the apparatus to:
apply a first scrambling hypothesis to a first subset of subframes within the DRS transmission window until the DRS transmission is successfully detected;
apply a second scrambling hypothesis to each of one or more subframes of a second subset of subframes within the DRS transmission window to attempt to decode the PDSCH transmission, wherein the second subset is subsequent to the first subset of subframes; and
signal to a base station that the first subset of subframes were not monitored for the PDSCH transmission.

22. The apparatus of claim 14, wherein the DRS transmission window is a first DRS transmission window, and wherein the instructions are executable by the processor to cause the apparatus to:
attempt to decode the DRS transmission in subframes of the first DRS transmission window;
identify one or more subframes within a second DRS transmission window; and
attempt to decode the PDSCH transmission in the one or more subframes of the second DRS transmission window.

23. The apparatus of claim 14, wherein the instructions are executable by the processor to cause the apparatus to:
determine that a scheduled paging opportunity during which a paging message may be transmitted to the UE overlaps with the DRS transmission window, the paging opportunity comprising a set of subframes to be monitored for the paging message; and
shift the set of subframes to be monitored for the paging message to be non-overlapping with the DRS transmission window.

24. The apparatus of claim 23, wherein the instructions are executable by the processor to cause the apparatus to:
shift the set of subframes to start a determined number of subframes following the DRS transmission, the start of the DRS transmission window, or the start of the scheduled paging opportunity.

25. The apparatus of claim 24, wherein the determined number of subframes is based at least in part on a UE specific identifier, a starting subframe number of the paging opportunity, or a combination thereof.

26. The apparatus of claim 14, wherein the instructions are executable by the processor to cause the apparatus to:
signal the UE capability to a base station.

27. An apparatus for wireless communication, comprising:
means for identifying a user equipment (UE) capability to monitor multiple scrambling hypotheses for transmissions received within a subframe;
means for identifying one or more subframes within a discovery reference signal (DRS) transmission window; and
means for attempting to decode one or more of: a DRS transmission, or a physical downlink shared channel (PDSCH) transmission, or both, in the one or more subframes based at least in part on the UE capability.

28. The apparatus of claim 27, further comprising:
means for applying a first scrambling hypothesis to a first subframe of the one or more subframes;
means for attempting to decode the DRS transmission in the first subframe;
means for applying the first scrambling hypothesis to a second subframe of the one or more subframes subsequent to the first subframe based at least in part on unsuccessfully decoding the DRS transmission in the first subframe; and
means for applying a second scrambling hypothesis to the second subframe based at least in part on successfully decoding the DRS transmission in the first subframe.

29. A non-transitory computer-readable medium storing code for wireless communication, the code comprising instructions to:
identify a user equipment (UE) capability to monitor multiple scrambling hypotheses for transmissions received within a subframe;
identify one or more subframes within a discovery reference signal (DRS) transmission window; and
attempt to decode one or more of: a DRS transmission, or a physical downlink shared channel (PDSCH) transmission, or both, in the one or more subframes based at least in part on the UE capability.

30. The non-transitory computer-readable medium of claim 29, wherein the code further comprises instructions to:
apply a first scrambling hypothesis to a first subframe of the one or more subframes;
attempt to decode the DRS transmission in the first subframe;
apply the first scrambling hypothesis to a second subframe of the one or more subframes subsequent to the first subframe based at least in part on unsuccessfully decoding the DRS transmission in the first subframe; and
apply a second scrambling hypothesis to the second subframe based at least in part on successfully decoding the DRS transmission in the first subframe.

* * * * *